United States Patent
Ariza

(10) Patent No.: US 10,675,128 B2
(45) Date of Patent: Jun. 9, 2020

(54) ORTHODONTIC SYSTEM AND METHOD OF USE

(71) Applicant: Joaquin T. Ariza, Bogotá (CO)

(72) Inventor: Joaquin T. Ariza, Bogotá (CO)

( * ) Notice: Subject to any disclaimer, the term of this patent is extended or adjusted under 35 U.S.C. 154(b) by 0 days.

(21) Appl. No.: 15/912,535

(22) Filed: Mar. 5, 2018

(65) Prior Publication Data

US 2018/0193113 A1 Jul. 12, 2018

Related U.S. Application Data

(60) Continuation-in-part of application No. 14/581,021, filed on Dec. 23, 2014, now Pat. No. 9,907,627, which is a continuation-in-part of application No. 14/300,975, filed on Jun. 10, 2014, now abandoned, which is a division of application No. 12/548,407, filed on Aug. 26, 2009, now abandoned.

(51) Int. Cl.
| | |
|---|---|
| *A61C 7/28* | (2006.01) |
| *A61C 7/22* | (2006.01) |
| *A61C 7/12* | (2006.01) |
| *A61C 7/14* | (2006.01) |

(52) U.S. Cl.
CPC ............... *A61C 7/282* (2013.01); *A61C 7/12* (2013.01); *A61C 7/22* (2013.01); *A61C 7/145* (2013.01)

(58) Field of Classification Search
CPC ................................................ A61C 7/12–34
USPC ....................................................... 433/8–24
See application file for complete search history.

(56) References Cited

U.S. PATENT DOCUMENTS

| | | | |
|---|---|---|---|
| 3,639,986 A | 2/1972 | Kesling | |
| 3,916,526 A | 11/1975 | Schudy | |
| 3,930,460 A | 1/1976 | Beck | |
| 4,533,320 A | 8/1985 | Piekarsky | |
| 4,927,362 A | 5/1990 | Snead | |
| 4,936,774 A * | 6/1990 | Stoller | A61C 7/12 433/110 |
| 5,197,873 A | 3/1993 | Wong | |
| 5,310,340 A | 5/1994 | Zedda | |
| 5,350,203 A * | 9/1994 | McNaughton | F16L 33/2075 285/305 |
| 5,356,288 A | 10/1994 | Cohen | |
| 5,380,197 A | 1/1995 | Hanson | |
| 5,540,586 A | 7/1996 | Hanson | |

(Continued)

FOREIGN PATENT DOCUMENTS

EP 0940125 9/1999

OTHER PUBLICATIONS

International Search Report dated Nov. 26, 2012 in Internation Application No. PCT/IB2012/051412.
Office Action dated Feb. 19, 2016 in U.S. Appl. No. 14/300,975.

*Primary Examiner* — Matthew M Nelson
(74) *Attorney, Agent, or Firm* — Jafari Law Group, Inc.

(57) ABSTRACT

The present disclosure relates to an orthodontic system and a method of using the same to perform orthodontics. In one example, an orthodontic system is presented. The orthodontic system includes a tube having at least one sidewall and two opening ends, and a luting agent. The luting agent is disposed on at least a portion of one or more of the at least one sidewall of the tube and a portion of a surface of a tooth onto which the tube is directly attached or adhered. The two opening ends of the tube remain substantially open so that a wire can move along the tube.

19 Claims, 21 Drawing Sheets

(56) References Cited

U.S. PATENT DOCUMENTS

| | | | |
|---|---|---|---|
| 5,931,667 A | 8/1999 | Papandreas | |
| 6,575,747 B1* | 6/2003 | Riitano | A61C 5/42 433/102 |
| 6,779,937 B1* | 8/2004 | Lombardi | A45D 40/205 401/6 |
| 7,927,097 B2 | 4/2011 | Cervera Sabater | |
| 8,251,699 B2 | 8/2012 | Reising | |
| 8,545,220 B2 | 10/2013 | Hwang | |
| 2002/0187453 A1* | 12/2002 | Clark | A61C 7/00 433/18 |
| 2004/0029067 A1* | 2/2004 | Wool | A61C 7/20 433/20 |
| 2004/0154133 A1* | 8/2004 | Polzin | B25F 5/006 16/430 |
| 2004/0157184 A1* | 8/2004 | Reising | A61C 7/14 433/8 |
| 2004/0259054 A1* | 12/2004 | Mayer | A61C 17/20 433/119 |
| 2005/0003324 A1* | 1/2005 | Reising | A61C 7/146 433/50 |
| 2005/0191592 A1* | 9/2005 | Farzin-Nia | A61C 7/00 433/22 |
| 2005/0244777 A1* | 11/2005 | Schultz | A61C 7/282 433/17 |
| 2006/0084032 A1* | 4/2006 | Tipton | A61C 3/00 433/141 |
| 2006/0110703 A1* | 5/2006 | Bills | A61C 1/082 433/102 |
| 2006/0269895 A1* | 11/2006 | Voudouris | A61C 7/02 433/10 |
| 2007/0087302 A1* | 4/2007 | Reising | A61C 7/145 433/24 |
| 2007/0218417 A1 | 9/2007 | de Salazar Vinas | |
| 2011/0039225 A1* | 2/2011 | Hagelganz | A61C 7/14 433/17 |
| 2011/0053108 A1 | 3/2011 | Ariza | |
| 2012/0129121 A1* | 5/2012 | Hwang | A61C 7/282 433/17 |
| 2014/0356800 A1* | 12/2014 | Ariza | A61C 7/282 433/17 |

\* cited by examiner

FIG. 1A
FIG. 1B
FIG. 1C
FIG. 1D
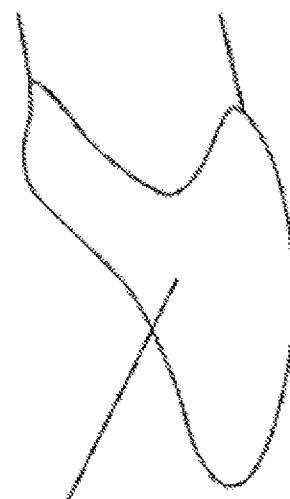
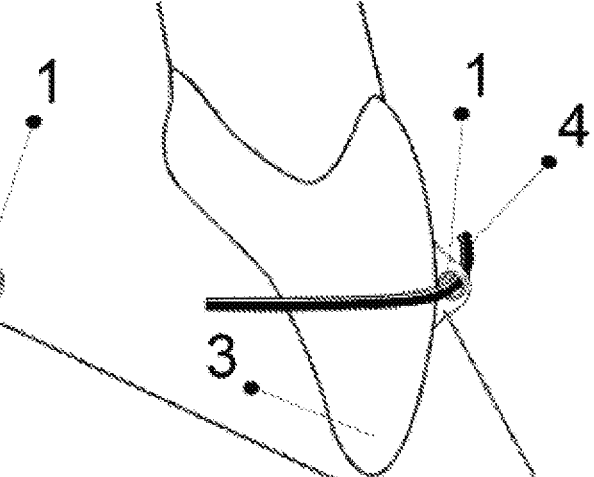
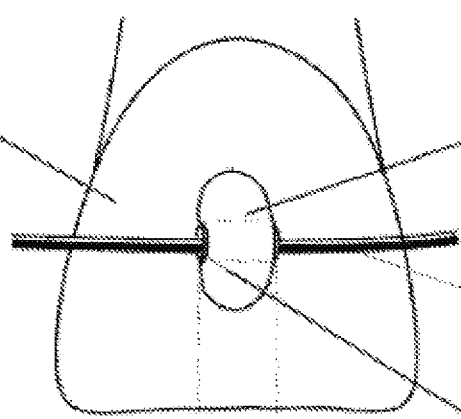
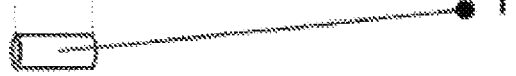

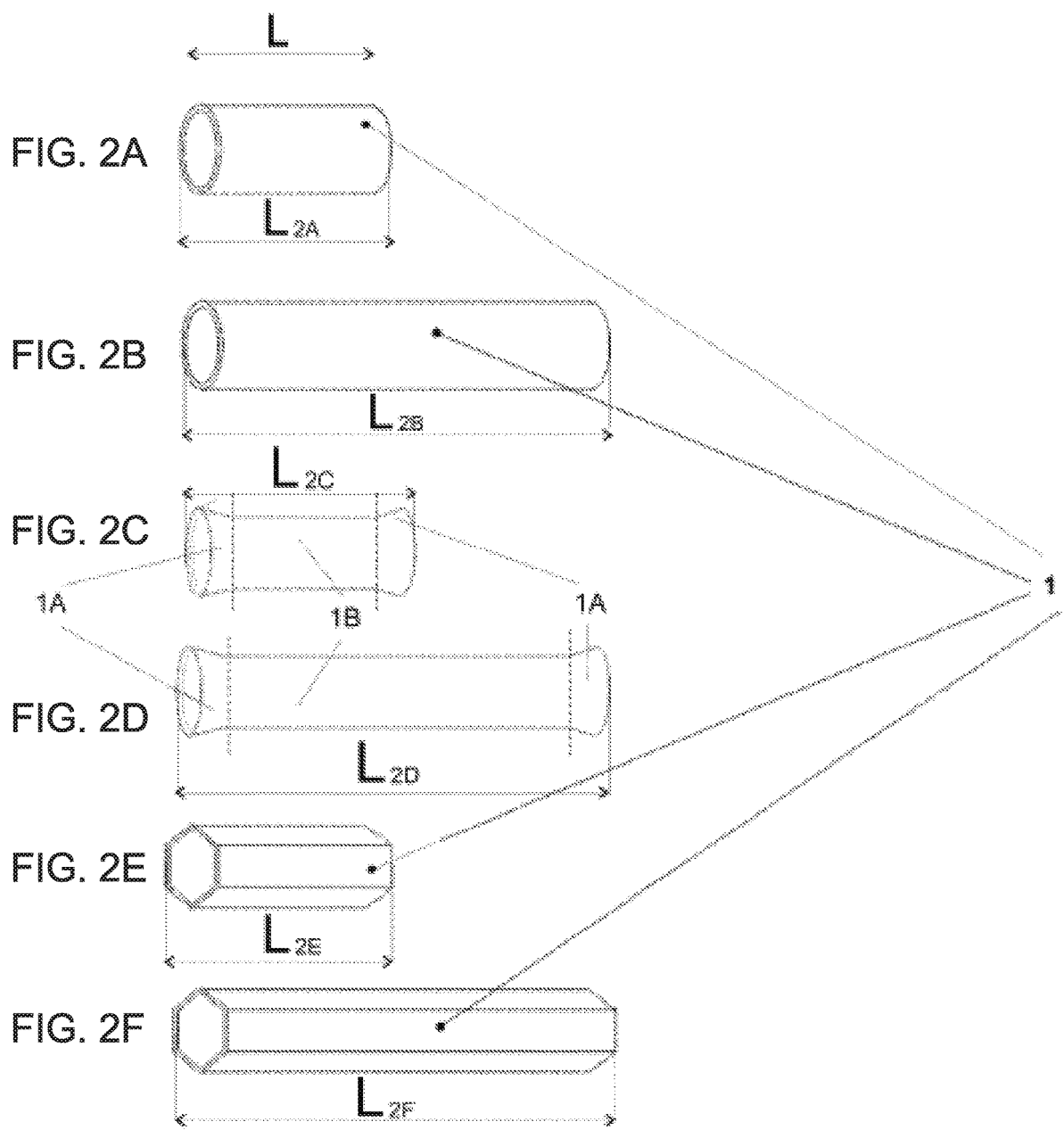

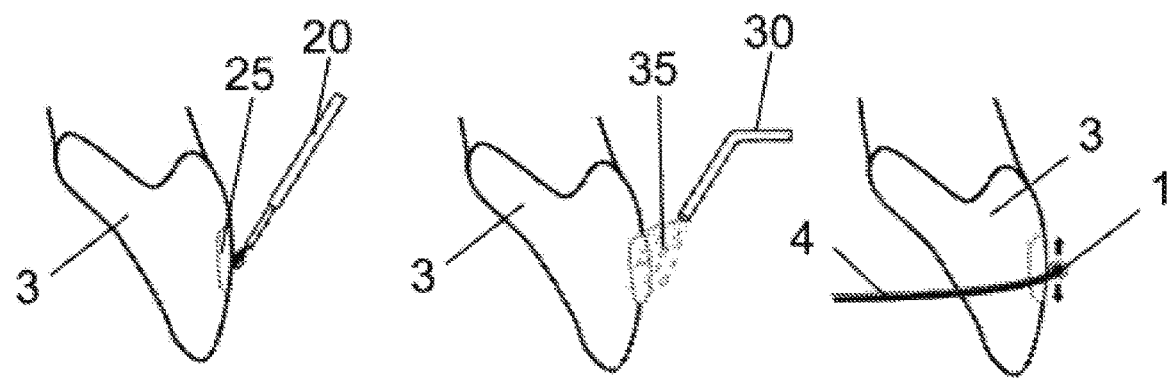
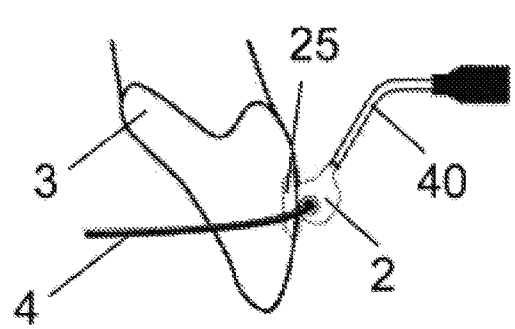
FIG. 9A  FIG. 9B  FIG. 9C  FIG. 9D  FIG. 9E

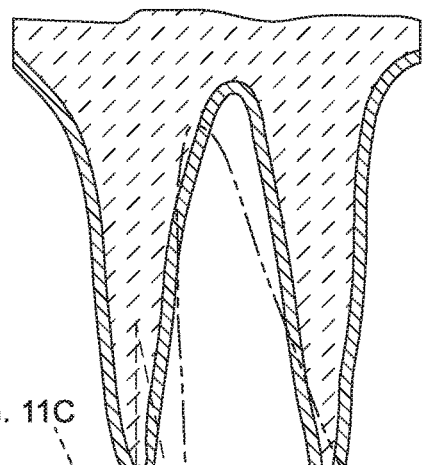
FIG. 11A
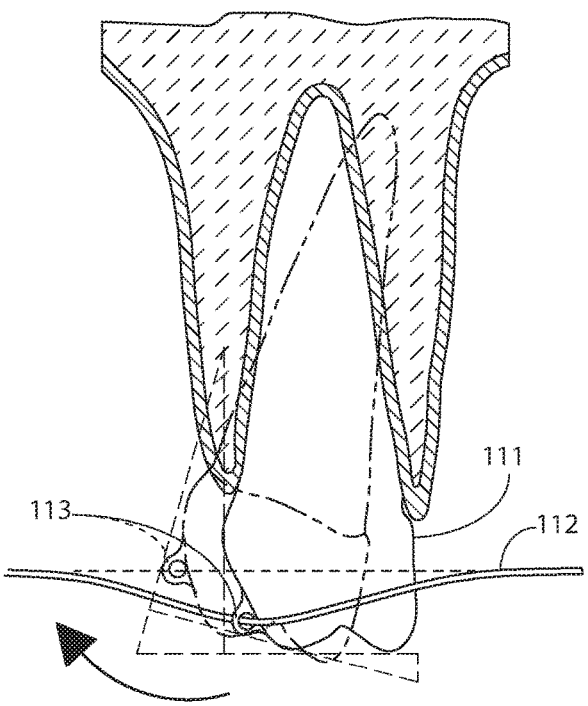
FIG. 11B
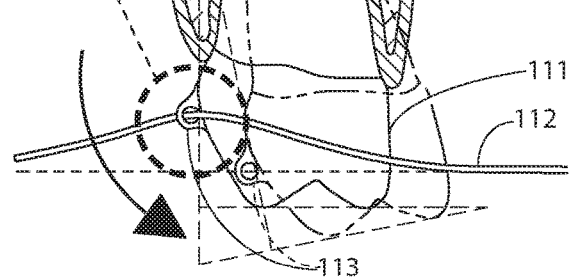
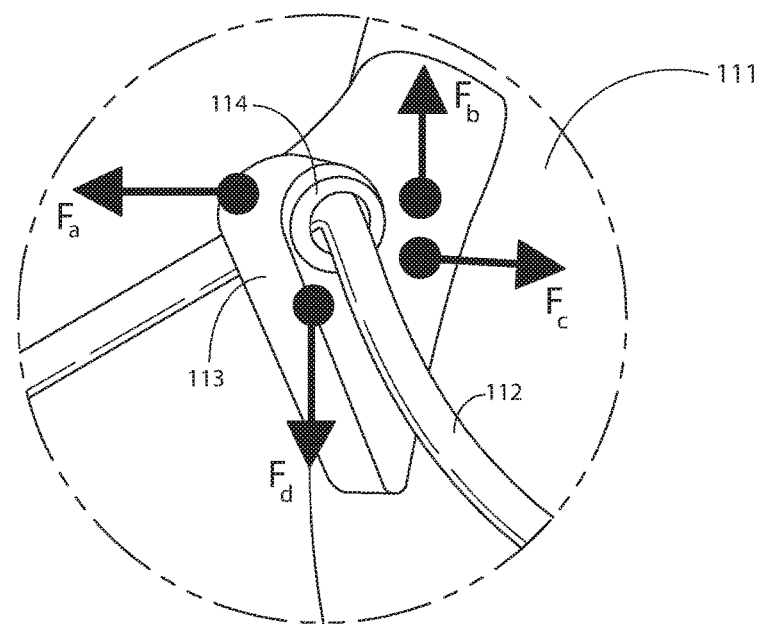
FIG. 11C

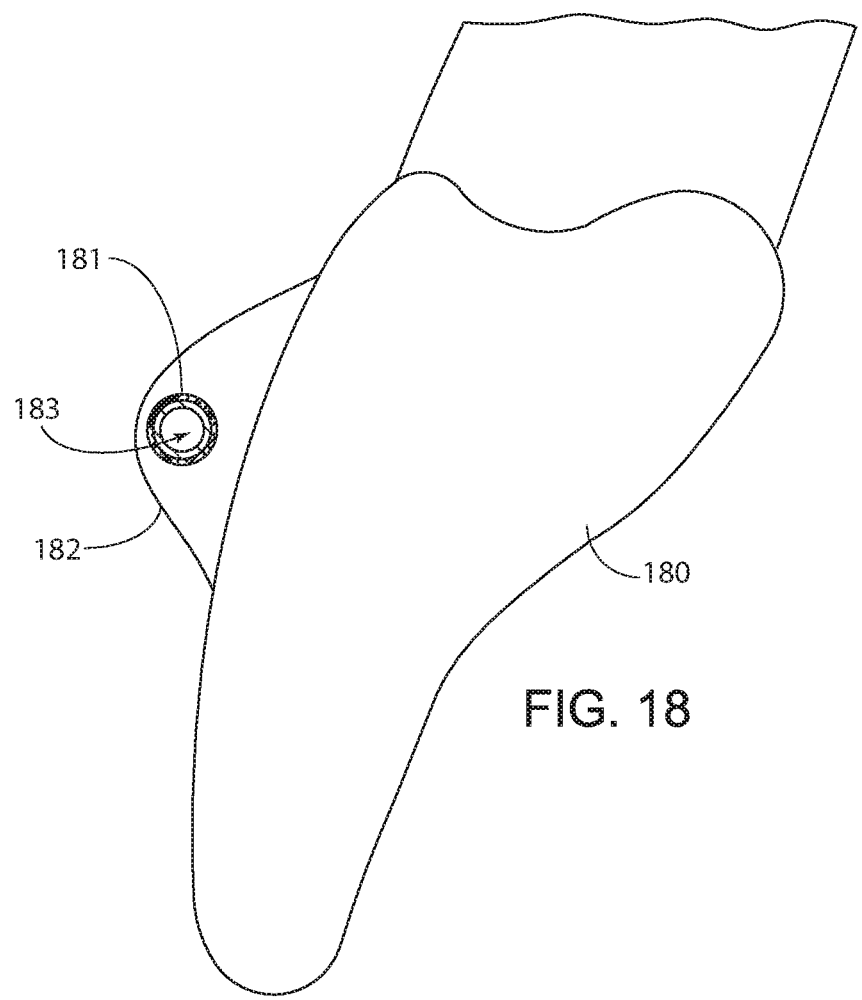
FIG. 18
FIG. 19
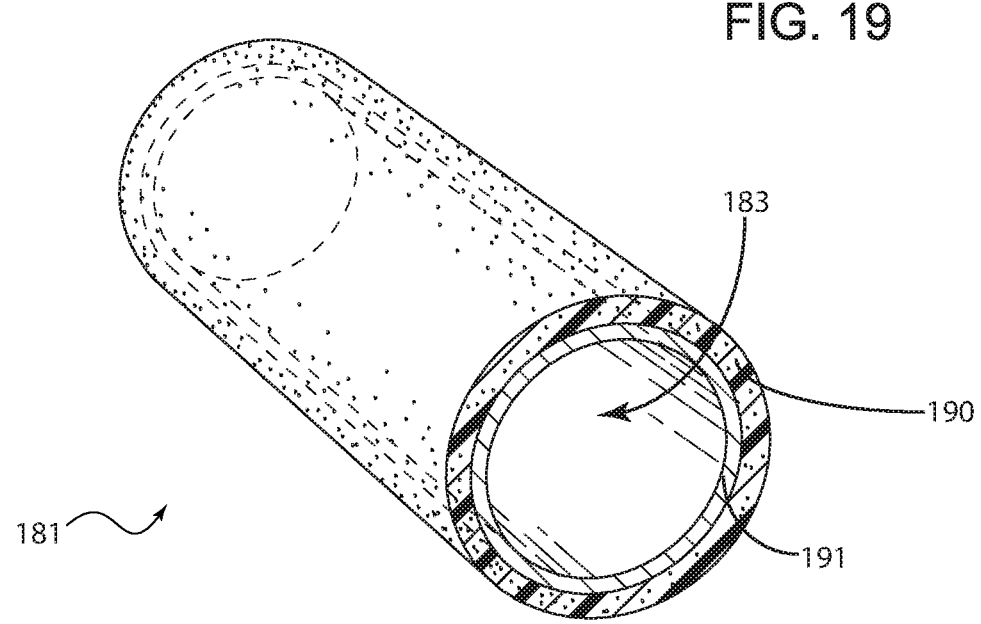

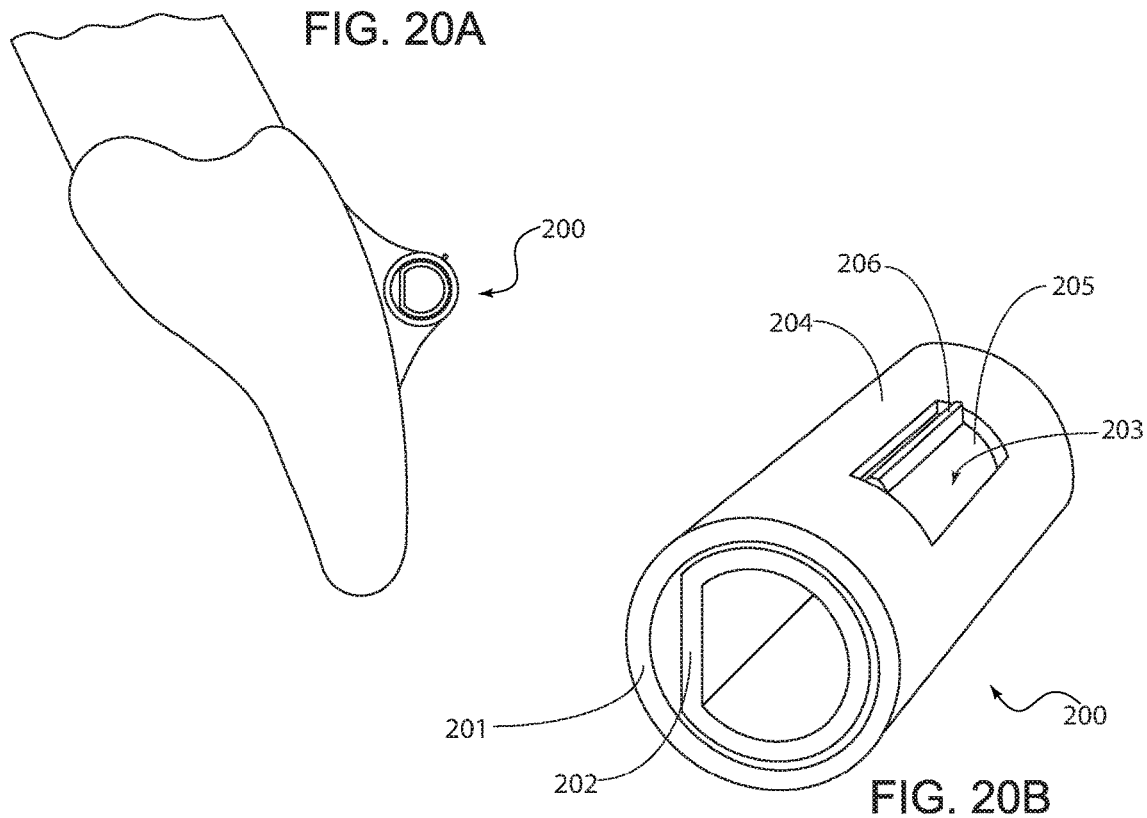
FIG. 20A
FIG. 20B
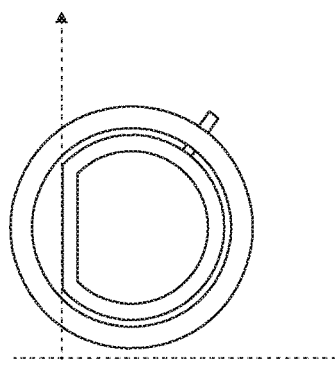
FIG. 20C
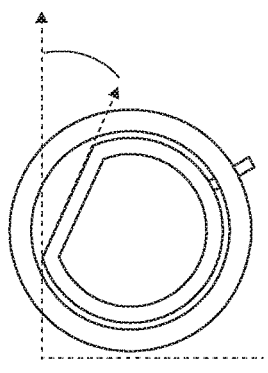
FIG. 20D
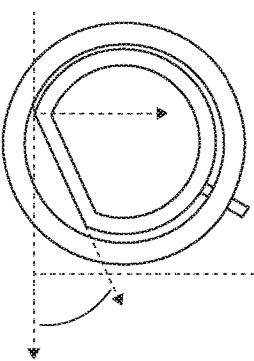
FIG. 20E

ORTHODONTIC SYSTEM AND METHOD OF USE

CROSS-REFERENCE TO RELATED APPLICATIONS

The present application is a continuation-in-part application claiming the benefit of priority to U.S. patent application Ser. No. 14/581,021, filed Dec. 23, 2014, which in turn is a continuation-in-part claiming the benefit of priority to U.S. patent application Ser. No. 14/300,975, filed Jun. 10, 2014, which in turn is a divisional application claiming the benefit of priority to U.S. patent application Ser. No. 12/548,407, filed Aug. 26, 2009, each of which is hereby incorporated by reference.

TECHNICAL FIELD OF THE INVENTION

The present disclosure relates to dentistry. Specifically, the present disclosure relates to an orthodontic system and a method of using the same to perform orthodontic care.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Orthodontics, a branch of dentistry, deals with misalignment of teeth and their correction. Misalignment of teeth may be at least partially corrected by imparting forces to the teeth over a period of time to bring about movements of the teeth toward desired positions. An orthodontic system may be used in such a procedure. An orthodontic system may include, e.g., a wire configured to exert forces, and structural components configured to impart the forces to the teeth involved in the procedure.

Historically, the process of orthodontics to place brackets involves a number of steps and procedures that not only increase the time to attend a patient in a clinical appointment and the likelihood of errors in each step performed by the orthodontist but also may increase the discomfort of the patient. This is at least partially due to the complex shape and the big size of the conventional appliances (brackets), which makes difficult to try to simplify the processes involved.

Additionally, the processes of placing and bonding these big conventional appliances (brackets) require high adhesive forces to sustain not only its own weight and volume but the anchorage of the wires and the auxiliary elements of the orthodontics (elastics, hooks complementary support and devices, among others) moreover the system has to be maintained in place during the chewing forces while the patient eats.

Therefore, there is a need to develop an improved orthodontic system and method to solve the above-mentioned problems. It is to these ends that the present invention has been developed.

SUMMARY OF THE INVENTION

The teachings disclosed herein relate to an orthodontic system and a method of using the same, including a method of placing and bonding the orthodontic system to the teeth of a patient.

In one example, an orthodontic system is presented. The orthodontic system may include a first tube adapted to adhere to a first tooth situated on a labial side or a lingual side of a dental arch of a patient distal to a most posterior section of teeth involved in an orthodontic treatment; a second tube adapted to adhere to a second tooth situated on an opposite labial side or an opposite lingual side of the dental arch of the patient, respectively; and an orthodontic arch wire inserted through a plurality of tubes, wherein the plurality of tubes are distinct from the first tube and the second tube, each of which comprises at least one sidewall and two opening ends that form a tubular passage, the opening ends adapted to allow the orthodontic arch wire to move along a length of the tubular passage, wherein: each tube of the plurality of tubes threaded by the orthodontic arch wire is configured to adhere to a surface of a tooth with a luting agent, and the orthodontic arch wire includes a first terminal end and a second terminal end configured to register with the first tube and the second tube, respectively, with the plurality of tubes in-between.

In one example, an orthodontic kit is presented. The orthodontic kit may include a package; an orthodontic arch wire enclosed in the package; and a plurality of tubes inserted onto the orthodontic arch wire, each including at least one sidewall and two opening ends that form a tubular passage adapted to allow the orthodontic arch wire to move along a length of the tubular passage, each of the plurality of tubes configured to adhere to a surface of a tooth with a luting agent.

In one example, a method for performing an orthodontic treatment is presented. The method may include providing an orthodontic arch wire that is inserted through a plurality of tubes, the orthodontic arch wire configured for use on either the labial side or the lingual side of a dental arch of a patient; and subsequently adhering each of the plurality of tubes on the orthodontic arch wire to the dental arch of the patient using a luting agent.

In another example, a method for performing an orthodontic treatment is presented. The method may include providing an arch wire that includes one or more pins extending outwardly and configured to register vertically with a tube, the tube including at least one sidewall and two opening ends that form a tubular passage adapted to receive a portion of one of the one or more pins; adhering the tube with a luting agent to a tooth on a labial side or a lingual side of a dental arch of a patient, the tube positioned vertically on a surface of the tooth; positioning the arch wire to align a pin of the one or more pins of the arch wire with the tube; and inserting the pin into the at tube.

In yet another example, an orthodontic system is presented. The orthodontic system includes a tube having at least one sidewall and two opening ends, and a luting agent. The luting agent is disposed on at least a portion of one or more of the at least one sidewall of the tube and a portion of a surface of a tooth onto which the tube is directly attached or adhered. The two opening ends of the tube remain substantially open so that a wire can move along the tube.

In yet another example, an orthodontic system is presented. The orthodontic system includes a tube having at least one sidewall and two opening ends. One or more of the at least one sidewall having a pre-applied luting agent. One of the one or more sidewalls can be pressed against a surface of a tooth so that the pre-applied luting agent attaches the tube directly onto the surface of the tooth. The two opening ends of the tube remain substantially open so that a wire can move along the tube.

In a different example, a method for performing orthodontics is presented. The method includes providing a plurality of tubes each of which has at least one sidewall and two opening ends; and for each of the plurality of tubes, depositing a luting agent on at least a portion of one or more of the at least one sidewall of the tube and a portion of a surface of a tooth onto which the tube is directly attached or adhere, and curing the luting agent. The two opening ends of each tube remain substantially open so that a wire can move along the tube.

In a further example, a method for performing orthodontics is presented. The method includes providing a plurality of tubes each of which has at least one sidewall and two opening ends, one or more of the at least one sidewall having a pre-applied luting agent; and for each of the plurality of tubes, pressing one of the one or more of the at least one sidewall against a surface of a tooth so that the pre-applied luting agent attaches the tube directly onto the surface, and curing the pre-applied luting agent. The two opening ends of each tube remain substantially open so that a wire can move along the tube.

In still a further example, a method for providing a tube is presented. The method includes receiving information related to an orthodontic treatment on one or more teeth of a patient; and providing, based on the information, the tube to be used in the orthodontic treatment, the tube having at least one sidewall and two opening ends. The tube is configured to be directly attached to a surface of a tooth of the patient using a luting agent, and the two opening ends of the tube remain substantially open so that a wire can move along the tube.

BRIEF DESCRIPTION OF THE DRAWINGS

The orthodontic system and the method of putting and using the same to perform orthodontics as disclosed herein are further described in terms of exemplary embodiments. These exemplary embodiments are described in detail with reference to the drawings, which have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. These embodiments are non-limiting exemplary embodiments, in which like reference numerals represent similar structures throughout the several views of the drawings. The drawings that accompany the detailed description can be briefly described as follows:

FIG. 1A illustrates a lateral view of a tooth that is treated with an orthodontic system according to some embodiments of the present disclosure;

FIG. 1B illustrates a lateral view of a tooth that is treated with an orthodontic system according to some embodiments of the present disclosure, in which a wire is shown;

FIG. 1C illustrates a frontal view of a tooth that is treated with an orthodontic system according to some embodiments of the present disclosure, in which a wire is shown;

FIG. 1D illustrates a tube included in an orthodontic system according to some embodiments of the present disclosure;

FIG. 2A-FIG. 4D illustrate various embodiments of a tube disclosed herein;

FIG. 9A-FIG. 9E illustrate a method of putting and using the orthodontic system according to some embodiments of the present disclosure;

FIG. 11A-FIG. 11C illustrate methods of applying a resin or luting agent and modifying a tube support to achieve different treatment goals, in accordance with practice of some embodiments of the present invention;

FIG. 18 illustrates a lateral view of a tooth that is treated with a tube including an elastic component according to some embodiments of the present disclosure;

FIG. 19 illustrates a tube in accordance with some embodiments of the present disclosure; and FIG. 20A-FIG. 20E illustrates an orthodontic system according to some embodiments of the present disclosure, in which a tube includes an exterior housing enclosing an interior D-shape tube, which may be variably positioned to modify positioning of a tooth.

DETAILED DESCRIPTION OF THE INVENTION

Figure 3A:
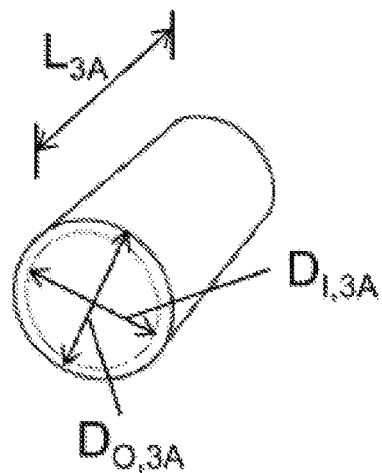

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention. Wherever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

The present disclosure relates to, among other things, an orthodontic system and a method of using the same to perform orthodontics, including a method of placing and bonding the orthodontic system to the teeth of a patient. Exemplary embodiments of the present disclosure are described with reference to the drawings for illustration purposes and are not intended to limit the scope of the present disclosure.

FIG. 1A-FIG. 1D illustrate lateral and frontal views of a tooth that is treated with an orthodontic system according to some embodiments of the present disclosure. Specifically, FIG. 1A illustrates a lateral view of a tooth that is treated with an orthodontic system according to some embodiments of the present disclosure; FIG. 1B illustrates a lateral view of a tooth that is treated with an orthodontic system according to some embodiments of the present disclosure, in which a wire is shown; FIG. 1C illustrates a frontal view of a tooth that is treated with an orthodontic system according to some embodiments of the present disclosure, in which a wire is shown; and FIG. 1D illustrates a tube included in an orthodontic system according to some embodiments of the present disclosure. The exemplary orthodontic system may include a tube 1 and a luting agent 2 (also referred to as the luting surround agent). The tube 1 may be directly attached to a surface of the tooth 3 by the luting agent 2, indicating that one or more sidewalls of the tube 1 either directly contact the surface of the tooth 3, or are separated from the surface of the tooth 3 by the luting agent 2, and there are no other structural components like, e.g., a base, located between or otherwise involved in the attachment of the one or more sidewalls of the tube and the surface of the tooth. The tube 1 may have at least one sidewall and two opening ends. The tube 1 may be substantially surrounded by or embedded or supported in the luting agent 2 disposed on at least a portion of the at least one sidewall of the tube 1. The two opening ends of the tube 1 may remain substantially open so that a wire 4 may go through and/or move along the tube 1.

In some embodiments, a tube may have at least one sidewall and two opening ends. A sidewall of a tube may have an inner wall and an outer wall. The inner wall(s) of the at least one sidewall may define and face the tubular passage of the tube. The tubular passage of the tube may allow a wire to go through the tube and/or move along it, as discussed elsewhere in the application. The outer wall(s) of the at least one sidewall may face the ambient surrounding the tube. As used herein, an outer cross-section of a tube refers to the surface and/or shape defined by the outer wall(s) of the at least one sidewall. A cross-section of a tube may have an annular shape defined by the inner wall(s) and the outer wall(s) of the at least one sidewall of the tube. That is, a cross-section of a tube may be defined by the cross-section of the tubular passage and the outer cross-section. The shape of the tubular passage may be, e.g., a circle, a polygon (e.g., a triangle, a rectangle, a square, a pentagon, a hexagon), an oval, or the like. The polygon may have one or more rounded corners. The shape of the tubular passage may be chosen based on considerations including, e.g., the shape of the wire to be inserted into the tube, friction between the tubular passage and the wire, ease of manufacture, or the like, or a combination thereof. The shape defined by the outer wall(s) (the outer cross-section) of the at least one sidewall of the tube may be, e.g., a circle, a polygon (e.g., a triangle, a rectangle, a square, a pentagon, a hexagon), an oval, or the like. The polygon may have one or more rounded corners. The shape defined by the outer wall(s) (the outer cross-section) of the at least one sidewall of the tube may be chosen based on considerations including, e.g., attachment of the tube to a surface of a tooth, comfort of a patient whose teeth are treated using the orthodontic system including the tubes disclosed herein, visibility of the orthodontic system including the tubes disclosed herein, ease of manufacture, or the like, or a combination thereof. The cross-section of the tubular passage and the outer cross-section may be concentric. The cross-section of the tubular passage and the outer cross-section may be symmetric about a same axis. As used herein, an inner dimension of a cross-section of a tube may refer to the largest dimension of the tubular passage at a cross-section of the tube; and an outer dimension of a cross-section of a tube may refer to the largest dimension of the outer cross-section of the tube.

FIG. 2A-FIG. 4D illustrate various embodiments of a tube disclosed herein. The double arrow L indicates the length direction of the tubes shown in these figures. FIG. 2A shows a cylindrical tube 1 with a sidewall and two opening ends. The sidewall may have an outer wall and an inner wall. The inner wall may define the tubular passage. A cross-section of the outer wall may form a first circle (outer cross-section), and a cross-section of the inner wall may form a second circle. At a cross-section of the tube 1, the first circle and the second circle may be concentric. A cross-section of the cylindrical tube 1, defined by the sidewall, may be a ring. At a cross-section of the tube 1, the outer dimension may be the largest dimension of the first circle (outer cross-section), i.e. the diameter of the first circle. The outer dimensions (or perimeters) of outer cross-sections along the length $L_{2A}$ of the tube 1, including the two opening ends, may be constant or substantially constant. As used herein, "substantially constant" indicates that the variation is less than 30%, or less than 25%, or less than 20%, or less than 15%, or less than 10%, or less than 5%. At a cross-section of the tube, the inner dimension may be the largest dimension of the circular tubular passage of the tube, i.e. the diameter of the second circle. The inner dimensions (or perimeters) of cross-sections of the tubular passage along the length $L_{2A}$ of the tube 1, including the two opening ends, may be constant or substantially constant. Except for the sidewall forming the tubular passage, the tube 1 does not have other structural components like, e.g., a base, a notch, a wing, or the like, or a combination thereof. FIG. 2B shows a cylindrical tube 1 with a sidewall and two opening ends. The cylindrical tube 1 shown in FIG. 2B may be the same as that shown in FIG. 2A, except that its length $L_{2B}$ is longer than the length, $L_{2A}$, of the cylindrical tube 1 shown in FIG. 2A.

FIG. 2C shows a tube 1 with a sidewall and two opening ends. The sidewall may have an outer wall and an inner wall. The inner wall may define the tubular passage. A cross-section of the outer wall may form a first circle (outer cross-section), and a cross-section of the inner wall may form a second circle. A cross-section of the tube 1, defined by the sidewall, may be a ring. At a cross-section of the tube 1, the first circle and the second circle may be concentric. The tube 1 may have a trumpet shape toward an opening end. The tube 1 as illustrated in FIG. 2C may have a middle section 1B (the section between the two dashed lines) located between two flared end sections 1A. The middle section 1B may be similar to the tubes 1 shown in FIG. 2A and FIG. 2B. In the middle section 1B, the outer dimensions (or perimeters) of outer cross-sections along the length $L_{2C}$ of the tube 1 may be constant or substantially constant; and the inner dimensions (or perimeters) of cross-sections of the tubular passage along the length $L_{2C}$ of the tube 1 may be constant or substantially constant. In a flared end section 1A, the outer dimensions (or perimeters) of outer cross-sections may decrease along the length $L_{2C}$ of the tube 1 from the opening end toward the middle section 1B; and the inner dimensions (or perimeters) of cross-sections of the tubular passage may decrease along the length $L_{2C}$ of the tube 1 from the opening end toward the middle section 1B. The inner dimension (or perimeter) of an opening end (the diameter or perimeter of the tubular passage at the opening end) may be larger than the inner dimension (or perimeter) of a cross-section in the rest of the flared end section 1A of the tube 1. The inner dimension (or perimeter) of an opening end (the diameter or perimeter of the tubular passage at the opening end) may be larger than the inner dimension (or perimeter) of a cross-section in the middle section 1B of the tube 1.

From an opening end toward the middle section 1B (between the two opening ends) along the length $L_{2C}$ of the tube 1, the outer dimensions (or perimeters) of the outer cross-sections may decrease in the flared end sections 1A and then remain constant or substantially constant in the middle section 1B. From an opening end toward the middle section 1B (between the two opening ends) along the length $L_{2C}$ of the tube 1, the outer dimensions (or perimeters) of the outer cross-sections of the tube may change in the flared end sections 1A and then remain constant or substantially constant in the middle section 1B. The change (e.g., increase, decrease) in the outer dimensions (or perimeters) of the outer cross-sections in a flared end section 1A may be gradual, or not gradual. Merely by way of example, the outer dimensions (or perimeters) of the outer cross-sections in a flared end section 1A may decrease gradually in some part(s) of the flared end section 1A and may change abruptly in other part(s) of the flared end section 1A. As another example, the outer dimensions (or perimeters) of the outer cross-sections in a flared end section 1A may be constant or substantially constant in some part(s) of the flared end section 1A and may change gradually or abruptly in other part(s) of the flared end section 1A. From an opening end toward the middle section 1B (between the two opening ends) along the length $L_{2C}$ of the tube 1, the inner dimensions (or perimeters) of the cross-sections of the tubular passage may decrease in the flared end sections 1A and then remain constant or substantially constant in the middle section 1B. The decrease in the inner dimensions (or perimeters) of the cross-sections of the tubular passage in a flared end section 1A may be gradual to avoid a sharp edge in the tubular passage in the flared end section 1A. The transition from the middle section 1B to the flared end section 1A may be smooth to avoid a sharp edge in the tubular passage at the interface of the middle section 1B and the flared end section 1A. A flared end section can improve the system performance when the tube is attached to the tooth surface by a luting agent.

Merely by way of example, a flared end section may help prevent the tube from slipping laterally into the luting agent when this has already hardened. Additionally, it may prevent the luting agent in the flowable state, from leaking to any of the two ends of the tube, blocking the insertion and the free sliding of the wire through the tube. A flared end section may facilitate the insertion of a wire into the tube. A flared end section may reduce the friction between the wire and the edge of the opening end, thereby allowing, e.g., a smooth sliding of the wire within the tube, when for example the orientation of two tubes are different due to misalignment of the teeth to which the tubes are fixed. Except for the sidewall forming the tubular passage, the tube does not have other structural components like, e.g., a base, a notch, a wing, or the like, or a combination thereof. FIG. 2D shows a tube with a sidewall and two opening ends. The tube shown in FIG. 2D may be the same as that shown in FIG. 2C, except that its length $L_{2D}$ is longer than the length, $L_{2C}$, of the tube shown in FIG. 2C.

FIG. 2E shows a tube 1 with six sidewalls and two opening ends. A sidewall may have an outer wall and an inner wall. The inner walls of the six sidewalls may define the tubular passage. A cross-section of the outer walls may form a first hexagon (outer cross-section), and a cross-section of the inner walls may form a second hexagon. At a cross-section of the tube 1, the first hexagon and the second hexagon may be symmetric about a same axis. The cross-section of the tube 1 may be an annular hexagon. At a cross-section of the tube 1, the outer dimension may be the largest dimension of the first hexagon defined by the six outer walls of the tube (outer cross-section). The outer dimensions (or perimeters) of outer cross-sections along the length $L_{2E}$ of the tube 1, including the two opening ends, may be constant or substantially constant. At a cross-section of the tube, the inner dimension may be the largest dimension of the hexagonal tubular passage of the tube 1, i.e. the second hexagon. The inner dimensions (or perimeters) of cross-sections of the tubular passage along the length $L_{2E}$ of the tube 1, including the two opening ends, may be constant or substantially constant. Except for the sidewalls forming the tubular passage, the tube does not have other structural components like, e.g., a base, a notch, a wing, or the like, or a combination thereof. FIG. 2F shows a tube 1 with six sidewalls and two opening ends. The tube 1 shown in FIG. 2F may be the same as that shown in FIG. 2E, except that its length $L_{2F}$ is longer than the length, $L_{2E}$, of the tube 1 shown in FIG. 2E. It is understood that the tube 1 as illustrated in FIG. 2E or FIG. 2F may include one or more flared end sections similar to those illustrated in FIG. 2C and FIG. 2D.

As a further example, a tube may have two sidewalls and two opening ends. A sidewall may have an outer wall and an inner wall. The inner walls of the two sidewalls may define the tubular passage. A cross-section of the outer walls may form a first half-oval, and a cross-section of the inner walls may form a second half-oval. A first half-oval may have a first long axis, and a first short axis. A second half-oval may have a second long axis, and a second short axis. At a cross-section of the tube, the first short axis and the second short axis may coincide, and the first half-oval and the second half-oval may be symmetric about the first/second short axis. At a cross-section of a tube, the outer dimension may be the largest dimension of the first half-oval (outer cross-section), i.e. the largest dimension along the first long axis of the first half-oval. At a cross-section of a tube, the inner dimension may be the largest dimension of the tubular passage of the tube, i.e. the largest dimension along the second long axis of the second half-oval. The outer dimensions (or perimeters) of the outer cross-sections along the length of the tube, including the two opening ends, may be constant or substantially constant. The inner dimensions (or perimeters) of cross-sections of the tubular passage along the length of the tube, including the two opening ends, may be constant or substantially constant. The tube may include one or more flared end sections similar to those illustrated in in FIG. 2C and FIG. 2D.

At a cross-section of a tube, the cross-section (e.g., shape) of the tubular passage defined by the inner wall(s) may be the same as the cross-section (e.g., shape) defined by the outer wall(s) of the at least one sidewall of a tube (outer cross-section), as illustrated in, e.g., FIGS. 2A-2F. Alternatively, the cross-section (e.g., shape) of the tubular passage defined by the inner wall(s) may be different from the cross-section (e.g., shape) defined by the outer wall(s) of the at least one sidewall of a tube (outer cross-section). E.g., at a cross-section of a tube, the shape of the tubular passage defined by the inner wall(s) may be, e.g., a circle, while the shape defined by the outer wall(s) (outer cross-section) may be, e.g., a polygon (e.g., a triangle, a rectangle, a square, a pentagon, a hexagon), an oval, or the like. The polygon may have one or more rounded corners.

On the other hand, e.g., at a cross-section of a tube, the shape of the tubular passage defined by the outer wall(s) may be, e.g., a circle, while the shape defined by the inner wall(s) (inner cross-section) may be, e.g., a polygon (e.g., a triangle, a rectangle, a square, a pentagon, a hexagon), an oval, or the like. The polygon may have one or more rounded corners.

Figure 3B:
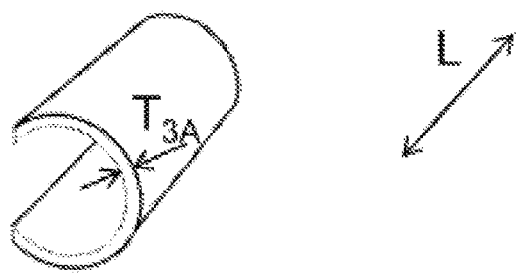

FIG. 3A shows a cylindrical tube with a sidewall and two opening ends. The cylindrical tube shown in FIG. 3A is similar to those shown in FIGS. 2A and 2B. FIG. 3B shows a portion of the sidewall of the cylindrical tube shown in FIG. 3A. The sidewall may have an outer wall and an inner wall. The inner wall may define the tubular passage. A cross-section of the outer wall of the sidewall may form a first circle (outer cross-section), and a cross-section of the inner wall of the sidewall may form a second circle. A cross-section of the cylindrical tube, defined by the sidewall, may be a ring or a partial ring (e.g., a ring without a portion of the sidewall at a cross-section of the tube), the first circle and the second circle may be concentric. At a cross-section of the tube, the outer dimension may be the largest dimension of the first circle (outer cross-section), i.e. the diameter of the first circle $D_{O,3A}$. The outer dimensions (or perimeters) of outer cross-sections along the length $L_{3A}$ of the tube 1, including the two opening ends, may be constant or substantially constant. At a cross-section of the tube, the inner dimension may be the largest dimension of the circular tubular passage of the tube, i.e. the diameter of the second circle $D_{I,3A}$. The inner dimensions (or perimeters) of cross-sections of the tubular passage along the length $L_{3A}$ of the tube, including the two opening ends, may be constant or substantially constant. The thickness of the sidewall $T_{3A}$ of the tube may be half of the difference between $D_{O,3A}$ and $D_{I,3A}$. In some embodiments, the thickness of a sidewall of a tube may be constant or substantially constant along the length of the tube. Except for the sidewall forming the tubular passage, the tube does not have other structural components like, e.g., a base, a notch, a wing, or the like, or a combination thereof.

Figure 3C:
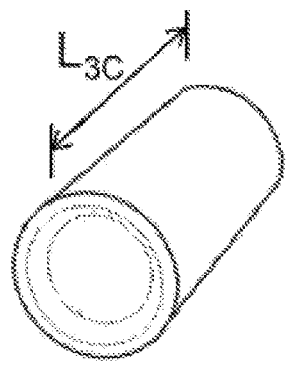

FIG. 3C shows a tube with a sidewall and two opening ends. The tube shown in FIG. 3C is similar to those shown in FIGS. 2C and 2D. The tube may have a middle section between two flared end sections. The middle section of the tube shown in FIG. 3C may be similar to the cylindrical tube shown in FIG. 3A. The transition from the middle section to a flared end section may be smooth such that there is no sharp edge in the tubular passage at the interface between the middle section and the flared end section.

Figure 4A:
Figure 4B:
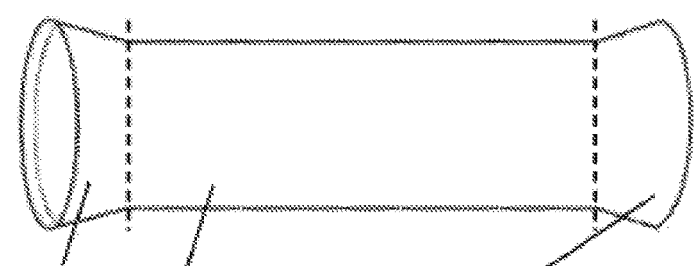
Figures 4C, 4D:
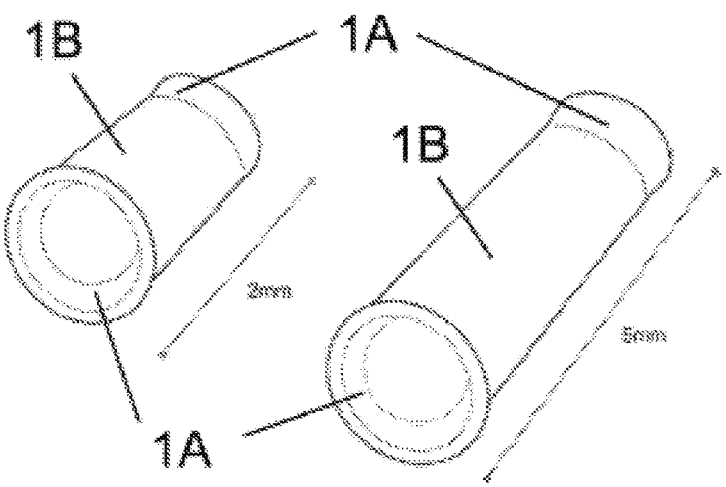

FIGS. 4A-4D show exemplary embodiments of a tube disclosed herein. The tubes shown in FIGS. 4A-4D may be similar to those shown in FIGS. 2C, 2D, and 3C. A tube may have a middle section 1B (the section between the two dashed lines) located between two flared end sections 1A. The tube as illustrated has a length (including the length of the two flared end sections 1A) of 5 millimeters (FIGS. 4A and 4D), or 2 millimeters (FIGS. 4B and 4C).

In some embodiments, a tube may have a length shorter than 2 millimeters, e.g., 1.5 millimeters, 1 millimeter, or shorter than 1 millimeter. In some embodiments, a tube may have a length between 2 millimeters and 5 millimeters, e.g., 2.5 millimeters, 3 millimeters, 3.5 millimeters, 4 millimeters, or 4.5 millimeters. In some embodiments, a tube may have a length larger than 5 millimeters, e.g., 5.5 millimeters, 6 millimeters, 6.5 millimeters, or 7 millimeters, or larger than 7 millimeters. A tube may be attached to one or more teeth using a luting agent. The length of a flared end section, if present in a tube, may be, e.g., lower than 5%, 8%, 10%, 15%, 20%, or 30% of the length of a tube. The length of a tube may be chosen based on considerations including, e.g., the size (e.g., the mesiodistal length) of a tooth onto which the tube is attached to, or the like.

In some embodiments, the inner dimension of a tube (or the inner dimension of the middle section of a tube having one or more flared end sections) may be less than 5 millimeters, or less than 4 millimeters, or less than 3 millimeters, or less than 1 millimeter, or less than 0.8 millimeters, or less than 0.6 millimeters, or less than 0.5 millimeters, or less than 0.4 millimeters. In some embodiments, the inner diameter of a tube may be approximately 1 millimeter, or approximately 0.8 millimeters, or approximately 0.6 millimeters, or approximately 0.5 millimeters, or approximately 0.4 millimeters. The inner dimension of the tube may be substantially the same or slightly larger than the dimension of a wire (e.g., the cross-section of the wire) that may go through the tube and may move along the tube, as discussed elsewhere in the application. Merely by way of example, the difference between the inner dimension of the tube and the dimension of the wire may be 0.5%, or 1%, or 2%, or 4%, or 5%, or 6%, or 8%, or 10%, or larger than 10% of the inner dimension of the tube (or the inner dimension of the middle section of a tube having one or more flared end sections). If a tube has one or more flared end sections (see, e.g., FIGS. 2C, 2D, 3C, and 4A-4D), the inner dimension of the middle section may be smaller than the inner dimension of a flared end section thereof. In this situation, the inner dimension of the middle section may provide more constraint on the dimension of a wire than the inner dimension of a flared end section. The difference between the inner dimension of an opening end of a flared end section and the inner dimension of the middle section of the tube may be 0.5%, 1%, 2%, 4%, 5%, 6%, 8%, 10%, 15%, 20%, or larger than 20% of the inner dimension of the middle section of the tube. From an opening end toward the middle section (between the two opening ends) along the length of a tube, the outer dimensions (or perimeters) of outer cross-sections in the flared end section may change. The change (e.g., increase, decrease) in the outer dimensions (or perimeters) of the outer cross-sections in a flared end section may be gradual, or not gradual. Merely by way of example, the outer dimensions (or perimeters) of the outer cross-sections in a flared end section may change gradually in some part(s) of the flared end section and may change abruptly in other part(s) of the flared end section. As another example, the outer dimensions (or perimeters) of the outer cross-sections in a flared end section may be constant or substantially constant in some part(s) of the flared end section and may change gradually or abruptly in other part(s) of the flared end section. From an opening end toward the middle section (between the two opening ends) along the length of a tube, the inner dimensions (or perimeters) of the cross-sections of the tubular passage in the flared end section may decrease. The decrease in the inner dimensions (or perimeters) of cross-sections of the tubular passage in a flared end section may be gradual to avoid a sharp edge in the tubular passage in the flared end section. The transition from the middle section to a flared end section may be smooth to avoid a sharp edge in the tubular passage at the interface of the middle section and the flared end section.

In some embodiments, the thickness of the sidewall of a tube may be less than less than 5 millimeters, or less than 4 millimeters, or less than 3 millimeters, or less than 1 millimeter, or less than 0.8 millimeters, or less than 0.6 millimeters, or less than 0.5 millimeters, or less than 0.4 millimeters, or less than 0.3 millimeters, or less than 0.2 millimeters, or less than 0.1 millimeters. In some embodiments, the thickness of a sidewall of a tube may be approximately 1 millimeter, or approximately 0.8 millimeters, or approximately 0.6 millimeters, or approximately 0.5 millimeters, or approximately 0.4 millimeters, or approximately 0.3 millimeters, or approximately 0.2 millimeters, or approximately 0.1 millimeters.

In an orthodontic system to be applied to a patient includes a plurality of tubes, the tubes may have different sizes, e.g., different lengths, inner/outer dimensions, wall thickness, depending on, e.g., the specific sizes of the teeth to which the tubes are to be attached. The tubes may be commercially available, or customarily made for a patient. As used herein, a patient refers to a person to whose teeth an orthodontic system is applied, and/or the orthodontics is performed.

In some embodiments, a tube may comprise a metal, e.g., stainless steel, titanium, or the like, or an alloy thereof. Merely by way of example, a tube may comprise a metal with a carbon coating. In some embodiments, a tube may comprise a nonmetallic material, e.g., a ceramic, a polymer, plastics, or the like, or a combination thereof. A ceramic may include, e.g., zirconium dioxide ($ZrO_2$), silicone dioxide, powered quartz, alumina, or the like, or a mixture thereof. Plastics may include, e.g., methyl methacrylate, polycarbonate, polyacrylic, polyethylene, polyester, resin, or the like, or a mixture thereof. A tube may comprise a material that is hard such that the tube may substantially maintain its shape to allow a wire to go through it and/or move along it, as discussed elsewhere in the application.

Also shown in FIGS. 1A-1C is the luting agent 2. The luting agent 2 has a high adhesiveness to the micro-porosities created by the conditioner acid on the tooth surface. The luting agent 2 may attach a tube 1 directly to a surface of the tooth 3. One or more sidewalls of the at least one sidewall of the tube may be attached directly to the surface of the tooth using the luting agent 2, indicating that the one or more sidewalls either directly contact the surface of the tooth 3, or are separated from the surface of the tooth 3 by the luting agent 2, and there are no other structural components like, e.g., a base, located between or otherwise involved in the attachment of the one or more sidewalls of the tube 1 and the surface of the tooth 3. The luting agent 2 may cover at least 30%, 40%, 50%, 60%, 70%, 80%, 90% or more of the surface area (defined by the outer wall(s)) of the at least one sidewall of the tube 1, providing a smooth surface outside of the at least one sidewall of the tube 1. The tube 1 may be substantially surrounded by or embedded in the luting agent 2 while it is attached or adhered directly to a surface of a tooth 3. This attachment may allow a force exerted onto the tube 1 (e.g., by the wire 4, which is discussed elsewhere in the application) to be transmitted to the tooth 3. The force on the tooth 3 may, e.g., at least partially correct misalignment of the tooth 3. The opening ends of the tube 1 may remain substantially open so that the wire 4 may go through and/or move along the tube 1.

The luting agent 2 may include, e.g., flowable resin, or the like. As used herein, resin may include any kind of resin that may be used in dentistry, or a substitute material, e.g., ceramics, ionomer, polymer. The luting agent 2 may have a suitable density as to wet the surface of the tooth, flow smoothly and cover the tube 1 before curing. The luting agent 2 may be light curable, such that it may harden when exposed to light, a process known as light-curing. The luting agent 2 may include a self-cure material, or a dual-cure material. The luting agent 2 may have or be manipulated to have a color that is the same as or similar to the color of the tooth 3.

In some embodiments, a luting agent may be pre-applied to a tube such that the tube may have at least one sidewall and two opening ends, one or more of the at least one sidewall having the pre-applied luting agent. One of the one or more sidewalls may be pressed against a surface of a tooth so that the pre-applied luting agent may attach the tube directly onto the surface of the tooth. The two opening ends may remain substantially open so that a wire may go through and/or move along the tube.

Further shown in FIGS. 1A-1C is the wire 4. The wire 4 may go through and/or move along the tube 1. The wire 4 may distribute or exert forces to a tube directly attached to a surface of a tooth, and the force may be imparted to the tooth. The forces applied to the tooth over a period of time may move the tooth to, e.g., correct its misalignment. The direction of the forces imparted to the tooth 3 may be adjusted by adjusting, e.g., the length of the wire 4, the orientation of the tube 1 directly attached to the surface of the tooth, or the like, or a combination thereof.

The wire 4 may comprise at least one type selected from the group consisting of, e.g. rigid, elastic or super elastic arches. The wire 4 may comprise at least one material selected from the group consisting of, e.g., stainless steel, nickel, titanium, copper, or the like, or an alloy thereof. Merely by way of example, the wire 4 may comprise a nickel-titanium alloy, or an alloy comprising copper, nickel, and titanium. In some embodiments, a wire may comprise a nonmetallic material, e.g., a ceramic, a polymer, plastics, or the like, or a combination thereof. Plastics may include, e.g., methyl methacrylate, polycarbonate, polyacrylic, polyethylene, polyester, resin, or the like, or a mixture thereof. Merely by way of example, a wire may comprise a metal with a carbon coating. The wire 4 may have a cross-section of a circle, a rectangle, a square, an oval, or the like. The dimension of the wire 4, referring to the largest dimension of a cross-section of the wire 4, may be less than 2 millimeters, 1 millimeter, or less than 0.8 millimeters, or less than 0.6 millimeters, or less than 0.5 millimeters, or less than 0.4 millimeters. In some embodiments, the inner diameter of a tube may be approximately 1 millimeter, or approximately 0.8 millimeters, or approximately 0.6 millimeters, or approximately 0.5 millimeters, or approximately 0.4 millimeters, or approximately 0.3 millimeters, or approximately 0.2 millimeters. The wire 4 may be commercially available. The wire 4 may be customarily made for a patient.

Figure 5:
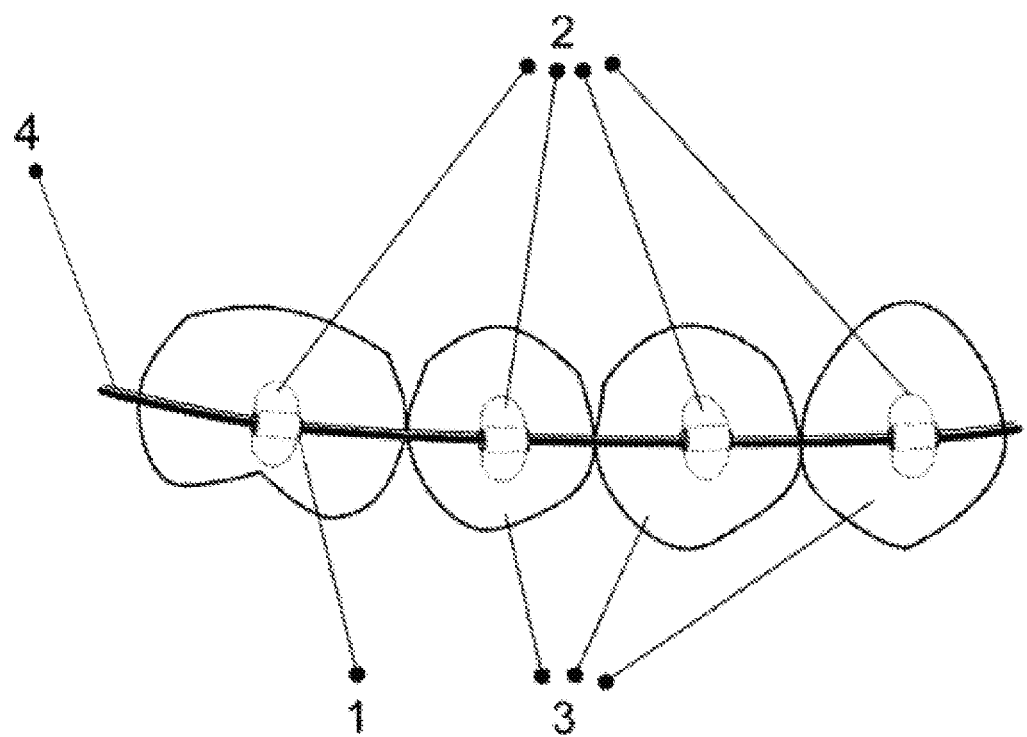
FIG. 5 illustrates a perspective view of some maxillary teeth that are treated with an orthodontic system according to some embodiments of the present disclosure.
Figure 6A:
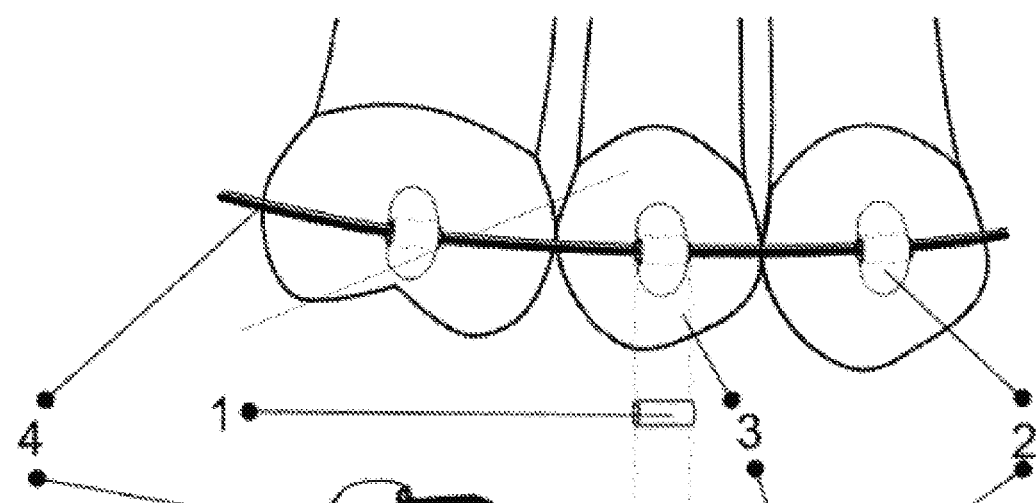
FIG. 6A illustrates a frontal view of some teeth that are treated with an orthodontic system according to some embodiments of the present disclosure.
Figure 6B:
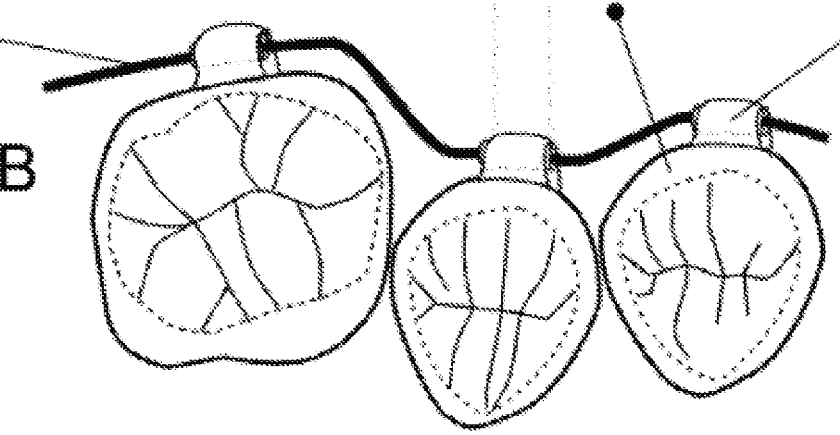
FIG. 6B illustrates a superior view of some teeth that are treated with an orthodontic system according to some embodiments of the present disclosure.

As illustrated in FIGS. 5-6B, an orthodontic system disclosed herein may include a plurality of tubes. FIG. 5 illustrates a perspective view of some maxillary teeth that are treated with an orthodontic system according to some embodiments of the present disclosure. The exemplary orthodontic system illustrated in FIG. 5 may include tubes 1, luting agents 2, and a wire 4. A tube 1 may be directly attached or adhered to a surface of a tooth 3 by the luting agent 2. The tube 1 may be substantially surrounded by or embedded in the luting surround agent 2 disposed on at least a portion of one or more of the at least one sidewall of the tube 1. The luting agent 2 may also be disposed on a portion of the surface of the tooth to which the tube 1 is directly attached or adhered. The two opening ends of the tube 1 may remain substantially open so that a wire 4 may go through and/or move along the tube 1. At least two of the tubes 1 included in the orthodontic system may be different in terms of size (e.g., length, diameter), orientation, or the like, or a combination thereof. These differences of the tubes 1 may be due to considerations including, e.g., the size of the teeth to which the tubes 1 are directly attached or adhere, the grade of misalignment of the teeth, the desired corrections, or the like, or a combination thereof. As the correction of the misalignment of one or more teeth progresses, the orthodontic system may be adjusted by, e.g., adjusting the orientation or the position of one or more tubes 1, adjusting the length of the wire 4, changing an old wire 4 to a new wire 4 which may include a different material, or have a different mechanical property (e.g., elasticity), a different cross-section (from a wire having a circular cross-section to a wire having a rectangular cross-section), or the like, or a combination thereof. One or more of these adjustments may provide an adjustment in the forces imparted to one or more teeth where the orthodontic system is applied.

FIG. 6A illustrates a frontal view of teeth that are treated with an orthodontic system according to some embodiments of the present disclosure. FIG. 6B illustrates a superior view of teeth that are treated with an orthodontic system according to some embodiments of the present disclosure. The exemplary orthodontic system illustrated in FIGS. 6A and 6B may include tubes 1, luting agents 2, and a wire 4. A tube 1 may be directly attached to a surface of a tooth 3 by the luting agent 2. The tube 1 may be substantially surrounded by or embedded in the luting agent 2 disposed on at least a portion of one or more of the at least one sidewall of the tube 1. The luting agent 2 may also be disposed on a portion of the surface of the tooth 3 to which the tube 1 is directly attached or adhered. The two opening ends of the tube 1 may remain substantially open so that a wire 4 may go through and/or move along the tube 1.

Figure 7A:
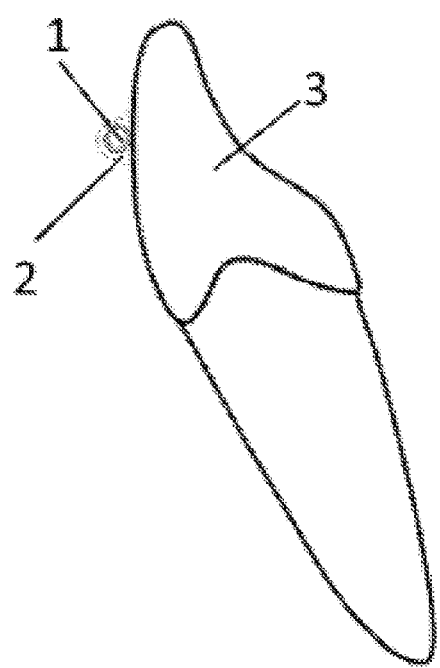
FIG. 7A illustrates an exemplary orthodontic system attached to the labial surface of an incisive tooth.

FIG. 7A illustrates an exemplary orthodontic system attached to the labial surface of an incisive tooth 3. As illustrated, the exemplary orthodontic system may include a tube 1 directly attached to the labial surface of the incisive tooth 3 using a luting agent 2.

Figure 7B:
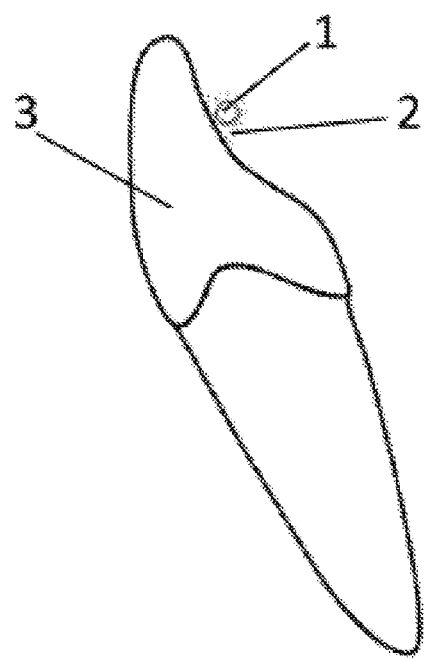
FIG. 7B illustrates an exemplary orthodontic system attached to the lingual surface of an incisive tooth.

FIG. 7B illustrates an exemplary orthodontic system attached to the lingual surface of an incisive tooth 3. As illustrated, the orthodontic system may include a tube 1 directly attached to the lingual surface of the incisive tooth 3 using a luting agent 2.

Figure 8A:
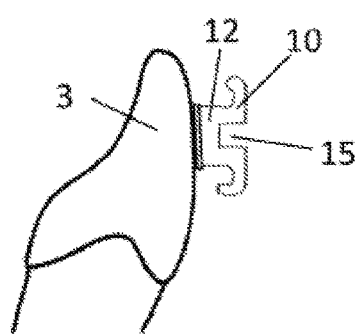
FIG. 8A illustrates a lateral view of a tooth that is treated with a conventional orthodontic system including a bracket.

FIG. 8A illustrates a lateral view of a tooth 3 that is treated with an orthodontic system including a bracket 10. The bracket 10 may include a base 12, and a slot 15. The bracket 10 may be attached to a surface of a tooth 3 at the base 12. The slot 15 may accommodate a wire (not shown in FIG. 8A).

Figure 8C:
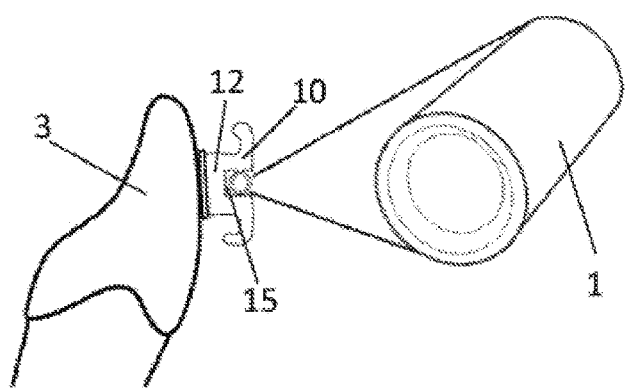
FIG. 8C illustrates a lateral view of a tooth that is treated with a conventional orthodontic system including a bracket, in which the size of the slot of the bracket is comparable to the size of a tube according to some embodiments of the present disclosure.
Figure 8B:
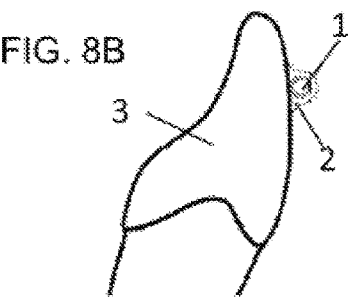
FIG. 8B illustrates a lateral view of a tooth that is treated with an orthodontic system according to some embodiments of the present disclosure.

FIG. 8B illustrates a lateral view of a tooth 3 that is treated with an orthodontic system according to some embodiments of the present disclosure. A tube 1 may be directly attached to a surface of a tooth 3 by the luting agent 2.

FIG. 8C illustrates a lateral view of a tooth 3 that is treated with an orthodontic system including a bracket 10. The bracket 10 may include a base 12, and a slot 15. As illustrated, the size of the slot 15 of the bracket 10 may be comparable to the size of a tube 1, according to some embodiments of the present disclosure.

FIG. 9A-FIG. 9E illustrate a method of installing the system to perform orthodontics according to some embodiments of the present disclosure. Briefly, the method may include providing a plurality of tubes each of which has at least one sidewall and two opening ends; for each of the plurality of tubes, depositing a luting agent on at least a portion of one or more of the at least one sidewall of the tube and a portion of a surface of a tooth onto which the tube is directly attached or adhered, and curing the luting agent. The two opening ends of a tube may remain substantially open so that a wire may go through and/or move along the tube. The method may also include, e.g., inserting a wire into one or more of the plurality of the tubes, cleaning or etching a surface of a tooth, or the like, or a combination thereof, before applying the luting agent. At least some of the plurality of the tubes 1 may be the same as or similar to those shown in FIG. 2A-FIG. 4D. At least some of the plurality of the tubes 1 may include one or more flared end sections as shown in FIG. 2C, FIG. 2D, FIG. 3C, and FIG. 4A-4D.

FIG. 9A shows cleaning, e.g. by way of etching, a portion 25 of a surface (e.g., a labial surface or a lingual surface) of a tooth 3 using, e.g., an acid conditioner. The portion of the surface to be cleaned or etched may be similar to or slighter larger than the area on the surface of the tooth where the luting agent may cover, which in turn may depend on the size and location of the tubes used in the method. The acid conditioner may include, e.g., 37% phosphoric acid, and may be applied using a brush or tool 20. The etching may take, e.g., 5 to 10 seconds. FIG. 9B shows rinsing the etched portion of the surface of the tooth 3 using, e.g., water 35, via a water spray gun 30. The rinsing may take, e.g., 30 to 40 seconds. The etching using an acid conditioner may create a (partially) demineralized surface including micropores that may be impregnated by a luting agent, e.g., a liquid or flowable resin with low viscosity. When the luting agent hardens or cures inside the micropores produced by the etching, micrometric mechanical lock may be created, thereby inducing adhesion.

FIG. 9C shows positioning a tube 1 on or close to the etched portion of the surface of the tooth 3. The positioning the tube 1 may include, e.g., choosing a desired location, a desired orientation, or the like, for the tube 1, in order to achieve the desired correction of misalignment of the tooth 3 according to the information given by a treatment plan. A wire 4 may be inserted into the tube 1 before the tube 1 is located and adhered to the surface of the tooth 3 using a luting agent 2, as illustrated in FIG. 9C and FIG. 9D. Alternatively, the wire 4 may be inserted into the tube 1 after the tube 1 is located and adhered to the surface of the tooth 3 using the luting agent 2.

FIG. 9D shows depositing a luting agent 2, e.g., a flowable resin, using a charged syringe of resin or a tool 40, on at least a portion of one or more of the at least one sidewall of the tube 1 and the cleaned or etched portion of the surface of the tooth 3 onto which the tube is to be directly attached or adhered. The luting agent 2 may be trickled downwards or upwards, relative to the position of the tube 1, to substantially cover the tube 1. The shape of the luting agent drop (of proper viscosity), may be maintained so as to avoid, e.g., the luting agent 2 from seeping and blocking (partially or completely) either one of the two opening ends of the tube 1, or blocking (partially or completely) the tubular passage of the tube 1. The luting agent 2 may cover a substantial portion of the at least one sidewall of the tube 1 along the length of the tube 1. Merely by way of example, the luting agent 2 may cover at least 30%, 40%, 50%, 60%, 70%, 80%, 90% or more of the surface area (defined by the outer wall(s)) of the at least one sidewall of the tube 1. The tube 1 may be substantially surrounded by or embedded in the luting agent 2. The two opening ends of the tube 1, as well as the tubular passage of the tube 1, may remain substantially open such that the wire 4 may go through and/or move along the tube 1.

FIG. 9E shows curing the luting agent 2 so that the tube 1 may be directly attached or adhere to the surface of the tooth 3. As illustrate, the luting agent 2 may be light curable by photo-polymerization. The curing may be achieved by directing light beams 55 from, e.g., a halogen lamp 50, at the luting agent 2. If the luting agent 2 is, e.g., self-cure or dual-cure, an appropriate curing method may be applied.

The procedure illustrated in FIG. 9A-FIG. 9E may be repeated for each tooth where the orthodontics is to be performed.

Some embodiments of the present disclosure relate to a method for performing orthodontics. The method may include providing a plurality of tubes each of which has at least one sidewall and two opening ends, one or more of the at least one sidewall having a pre-applied luting agent; for each of the plurality of tubes, pressing one of the one or more of the at least one sidewall against a surface of a tooth so that the pre-applied luting agent attaches the tube directly onto the surface, and curing the pre-applied luting agent. The two opening ends of a tube may remain substantially open so that a wire may move along the tube. The method may also include, e.g., inserting a wire into one or more of the plurality of tubes, cleaning or etching a surface of a tooth, or the like, or a combination thereof before applying the luting agent. The wire may be inserted into one or more of the plurality of tubes, before that the tube or the plurality of the tubes are positioned and attached to the surface of the tooth using the luting agent. Alternatively, the wire may be inserted into the tube after the tube is positioned and attached to the surface of the tooth using the luting agent. At least some of the plurality of the tubes 1 may be the same as or similar to those shown in FIG. 2A-FIG. 4D. At least some of the plurality of the tubes 1 may include one or more flared end sections as shown in FIG. 2C, FIG. 2D, FIG. 3C, and FIG. 4A-4D.

In some embodiments, the method for performing orthodontics may further include placing, to a side of the dental arch, a tube to a tooth (or a part of the dental arch) distal to the most posterior teeth involved in a treatment (molar or premolar). In an initial stage, such a tube may provide a posterior guidance to the tubes inserted in the arch wire, to be subsequently attached to the teeth involved in the treatment. A wire may be inserted into one or more tubes after several or all of the plurality of tubes are positioned and attached to the teeth using a luting agent and the luting agent is cured. A wire may be inserted into one or more tubes before several or all of the plurality of tubes are positioned for attachment by, e.g., depositing and curing the luting agent.

As the correction of the misalignment of one or more teeth progresses, the orthodontic system may be adjusted by, e.g., adjusting the orientation of one or more tubes (by way of, e.g., detaching an old tube, and repositioning the old tube without removing it out of the arch or replacing it with a new tube, and attaching the repositioned or new tube to a surface of the tooth according to a method disclosed herein), adjusting the length of the wire, changing an old wire to a new wire which may comprise a different material, or have a different mechanical property (e.g., elasticity), a cross section of a different caliber, or a different cross-section (from a wire having a circular cross-section to a wire having a rectangular cross-section), or the like, or a combination thereof. Adjusting the length of the wire, or replacing the old wire with a new wire, may be achieved without removing or detaching the tubes. Merely by way of example, the length of the wire may be adjusted by removing a portion of the wire at one end of the wire. As another example, replacing the old wire with a new wire may be achieved by, e.g., removing the old wire, and inserting a new wire into the tubes already in place. One or more of these adjustments may provide an adjustment in the forces imparted to one or more teeth where the orthodontic system is applied.

A conventional system of brackets may be directly installed in the whole dental arch, in only one step and clinical appointment, or it may be indirectly installed in dental models made from impressions taken previously. In the indirect method, brackets are placed in the desired positions on a dental model of teeth of a patient. This may be done while the patient is not present. Afterwards the impression of the dental model with brackets may be taken, using a transfer tray and a proper impression material, and the brackets may be placed, attached or adherer onto the teeth of the patient. Both direct and indirect methods are applicable with the orthodontic system disclosed herein.

Merely by way of example, an exemplary assembly method includes the following steps: preparing the simplified orthodontic system and inserting a wire-arch (e.g., a wire) into the tubes; preparing and etching the tube surface and the surfaces of the teeth; placing the tubes and the arch wire in the desired places on the surfaces of the teeth; and applying the luting resin on the tubes and the surfaces of the teeth previously prepared and then letting the resin photo polymerize.

Some embodiments of the present disclosure relate to a method for providing a tube to be used in an orthodontic treatment on one or more teeth of a patient. The method may comprise receiving information related to the orthodontic treatment; and providing, based on the information, the tube. The information may include, e.g., the sizes, the colors, the positions (e.g., current and/or desired positions) of some or all the teeth of the patient, an orthodontic treatment plan prepared for the patient, allergy conditions of the patient, preference of the patient regarding, e.g., material or color of the tube to be provided, or the like, or a combination thereof. A tube may have at least one sidewall and two opening ends. A tube may be configured to be directly attached to a surface of a tooth using a luting agent. The two opening ends of the tube may remain substantially open so that a wire can move along the tube, after the tube is attached to a tooth using the luting agent. The tube may comprise one or more flared end sections. The method may further comprise providing the luting agent. In some embodiments, the method may further comprise applying the luting agent to at least a portion of one or more of the at least one sidewall of the tube. In some embodiments, the luting agent may be deposited onto at least a portion of one or more of the at least one sidewall of the tube when the orthodontic treatment is performed. The method may comprise providing, based on the information, a plurality of tubes to be used in an orthodontic treatment on one or more teeth of a patient. The method may further comprise providing a wire.

Figure 10A:
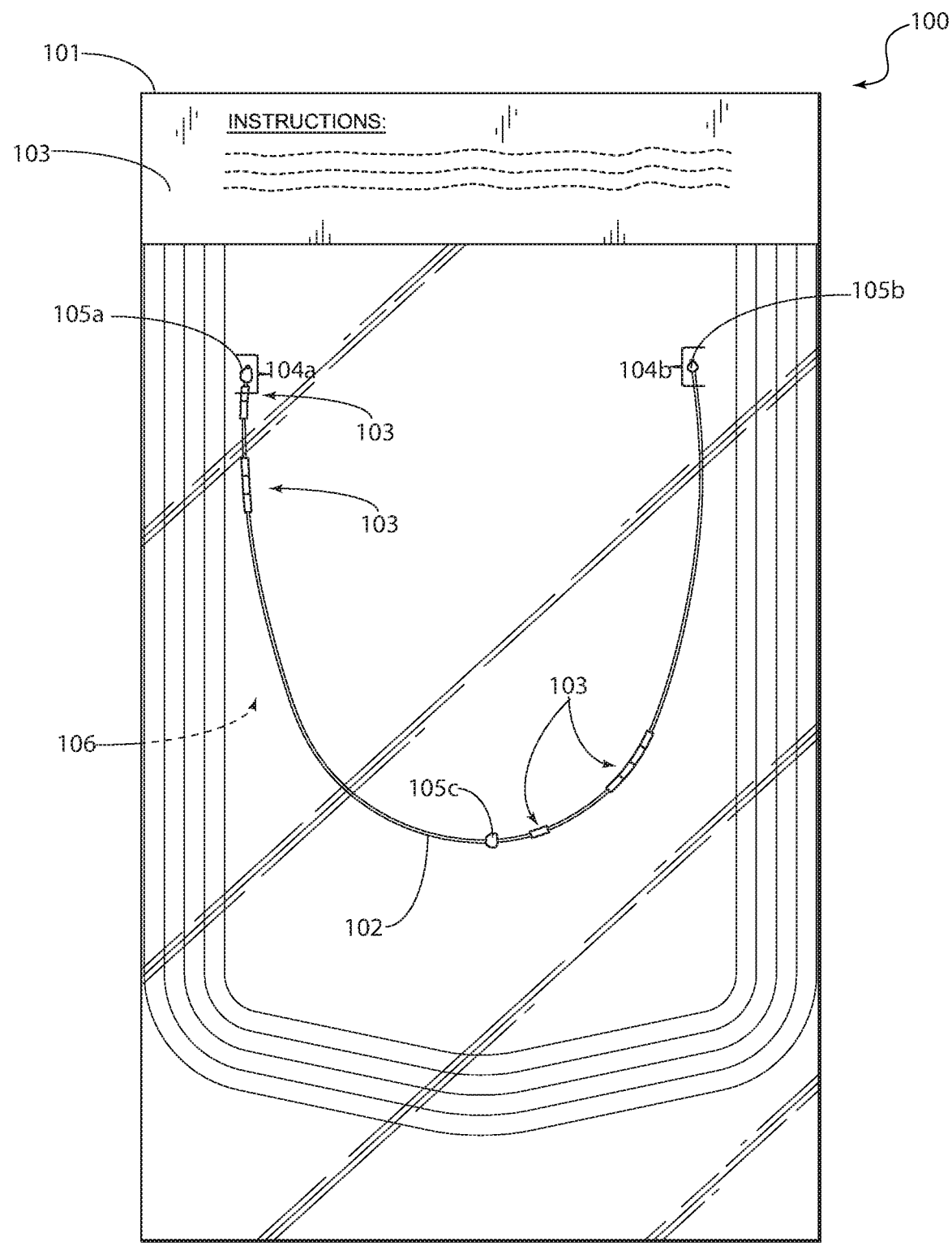
FIG. 10A illustrates a kit or part of a kit for an orthodontics system in accordance with some embodiments of the present invention.

Turning now to the next figure, FIG. 10A illustrates a kit for an orthodontics system in accordance with some exemplary embodiments of the present invention. More specifically, FIG. 10A depicts kit 100, which includes a packaging or package 101 enclosing an orthodontic arch wire 102 that has been inserted through a plurality of tubes 103, each tube threaded on to, or traversed by the arch wire 102. At terminal ends 104a and 104b of the arch wire 102, a removable adhesive 105a and 105b, respectively may be adhered thereto for securing the arch wire 102 to an interior surface 106 of the packaging 101 and or preventing the plurality of tubes 103 from detaching from the arch wire 102 or otherwise becoming unthreaded therefrom.

In exemplary embodiments, the orthodontic kit comprises a package; an orthodontic arch wire enclosed in the package; and a plurality of tubes inserted onto the orthodontic arch wire, each tube including at least one sidewall and two opening ends that form a tubular passage adapted to allow the orthodontic arch wire to move along a length of the tubular passage, each of the plurality of tubes configured to adhere to a surface of a tooth with a luting agent.

Package 101 may be a simple plastic or paper envelope or may include a sealable or single-use structure to protect the items therein from being tampered with. As shown, package 101 may include a label 105 for providing instructions such as instruction opening the package and or sterilizing the contents therein. In exemplary embodiments, the package 101 comprises a self-seal sterilization pouch for keeping the orthodontic arch wire 102 and plurality of tubes 103 securely and enclosed. In other exemplary embodiments, the package 101 is a single-use package for preventing tampering. In other exemplary embodiments, package 101 is a single-use, self-sterilization package.

Orthodontic arch wire 102 may be any arch wire suitable for orthodontics, which has been inserted through a plurality of tubes in accordance with the present invention. Arch wire 102 may have a circular or round cross-section, or a rectangular or even polygonal cross-section without limiting the scope of the present invention. In the shown exemplary embodiment, orthodontic arch wire 102 includes terminal ends 104a and 104b, to which removable adhesive blocks 105a and 105b (respectively) have been applied in order to secure the tubes 103 on to the orthodontic arch wire 102 and prevent the plurality of tubes 103 from becoming unthreaded from the orthodontic arch wire 102. Further, in some embodiments, the orthodontic arch wire 102 is further secured to an interior surface 106 of the package 101 by an additional removable adhesive block 105c. The adhesive blocks help to keep components of the kit intact as well as ease the implementation of the components in an orthodontic method in accordance with the present invention—for example, in practice of some embodiments of the present invention, a practitioner need only remove the arch wire including the tubes and apply it to a patient's dental arch as disclosed herein. Of course, in other embodiments of kit 100, the arch wire may be provided on its own and decoupled from each of the plurality of tubes. In yet other embodiments, orthodontic arch wire 102 is detached from interior surface 106 of package 101 but sits inside the package snuggly, with adhesive blocks 105a and 105b securing tubes 103 onto the arch wire.

In exemplary embodiments, each of the plurality of tubes excludes a base, a notch, a wing, or a combination thereof—as shown in FIG. 10A. In other exemplary embodiments, at least one of the plurality tubes further includes a pre-applied luting agent on a surface of the tube. In other exemplary embodiments, as will be discussed further below, arch wire 102 and the plurality of tubes 103 may be magnetized. Moreover, other components such as other segments or types of arch wires, other types of tubes mentioned in this disclosure and other types of components that may be required for implementation of an orthodontic system in accordance with the present disclosure, may be provided for as part of kit 100, without limiting or deviating from the scope of the present invention.

Figure 10B:
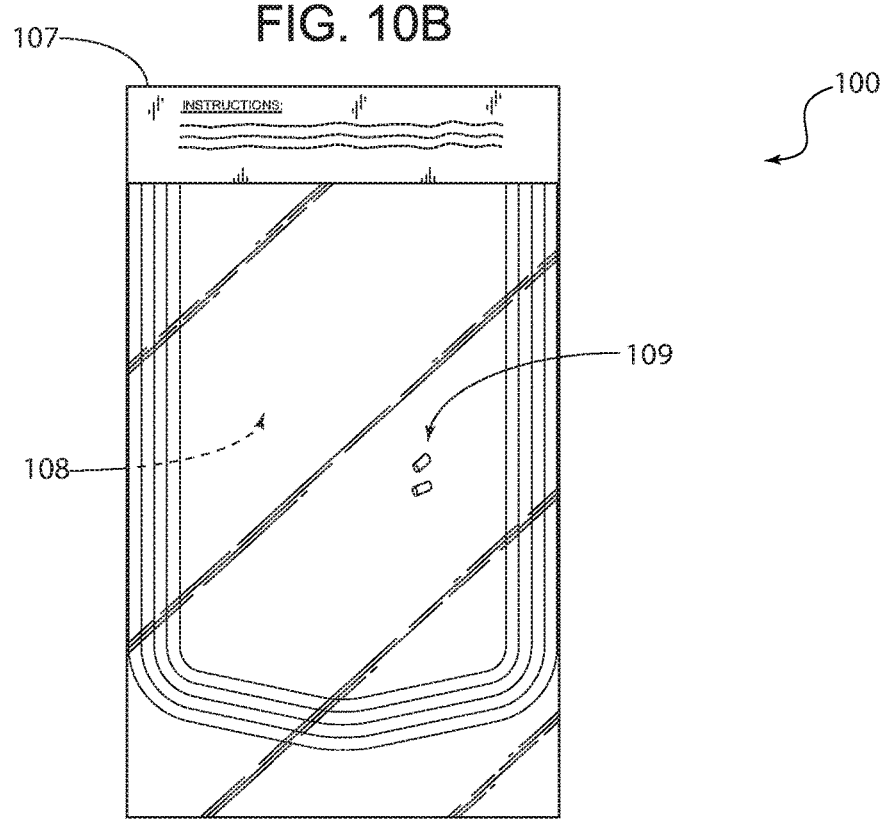
FIG. 10B illustrates a kit or part of a kit for an orthodontics system in accordance with some embodiments of the present invention.

FIG. 10B illustrates a kit or part of a kit for an orthodontics system in accordance with some embodiments of the present invention. More specifically, package 107 is illustrated, which includes or encloses one or more loose tubes 109 configured to receive a portion of the orthodontic arch wire 102. In one embodiment of the present invention, kit 100 includes either package 101 or package 107. In another embodiment of the present invention, kit 100 includes both packages 101 and 107. Moreover, in an exemplary embodiment, rather than including tubes 109, package 107 may include other components of an orthodontic system in accordance with the present invention such as but not limited to other types of tubes or wire segments or components that may be used in conjunction with or in lieu of arch wire 102—for example, and without limiting the scope of the present invention, one or more tubes such as tube 122, and or one or more wire segments such as wire segments 139, 150, and or one or more extensions such as extension 151, and or one or more arch wires such as arch wire 121, arch wire 160, and or one or more pins such as pins 161, and or one or more tubes such as tube 123, or tube 190, and or one or more elastic bases such as elastic base 179, and or one or more tubes such as tube 200, and or luting agents including a luting agent such as luting agent 176 and or luting agent 178, and or any other component or a combination thereof suitable for a system in accordance with the present invention.

Figure 10C:
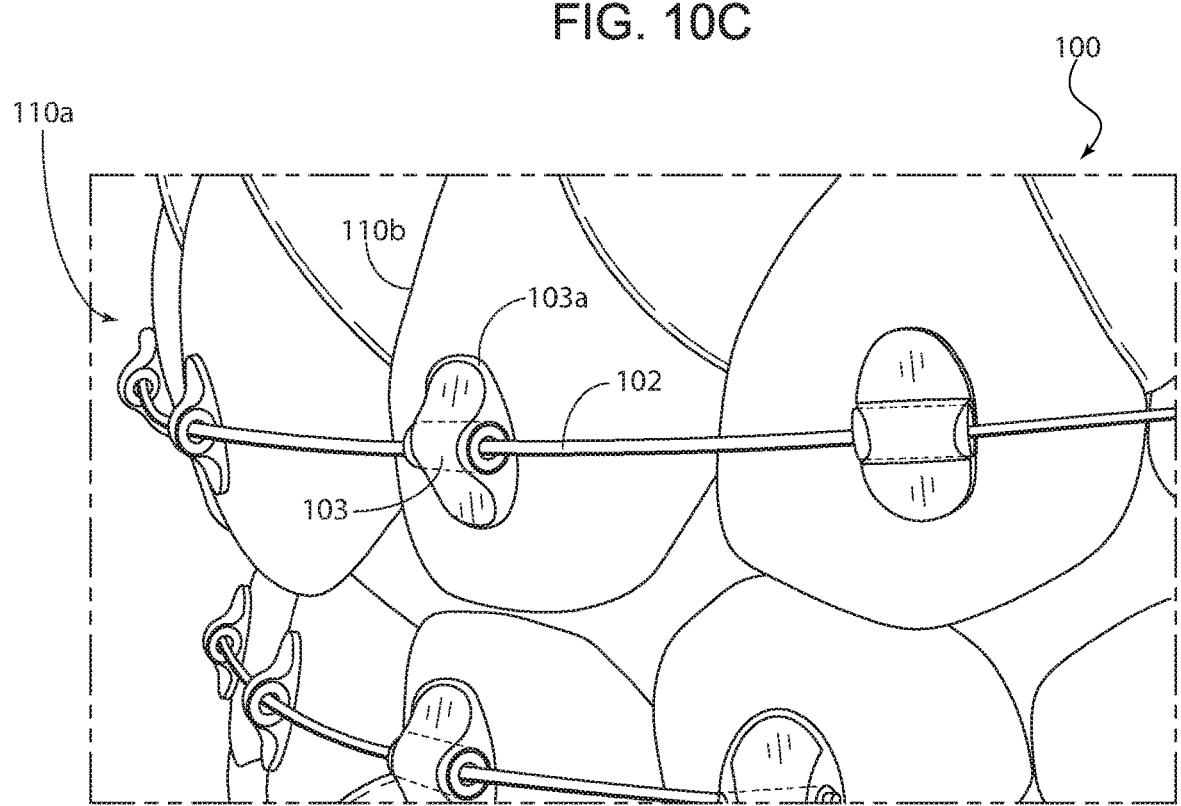
FIG. 10C illustrates a perspective view of an orthodontic system in accordance with some embodiments of the present invention, which has been applied to a patient's teeth.

Turning to the next figure, FIG. 10C illustrates a perspective view of the components of kit 100, which have been applied to a patient's teeth 110a. More specifically, FIG. 10C depicts orthodontic arch wire 102 inserted through a plurality of tubes 103, wherein the plurality of tubes, each of which comprises at least one sidewall and two opening ends that form a tubular passage, the opening ends adapted to allow the orthodontic arch wire 102 to move along a length of the tubular passage. In exemplary embodiments, the orthodontic system further comprises a first tube adapted to adhere to a first tooth situated on a labial side or a lingual side of a dental arch of a patient distal to a most posterior section of teeth involved in an orthodontic treatment. Moreover, the orthodontic system may further include a second tube adapted to adhere to a second tooth situated on an opposite labial side or an opposite lingual side of the dental arch of the patient, respectively. In these embodiments, the plurality of tubes are distinct from the first tube and the second tube. In some exemplary embodiments, each tube of the plurality of tubes 103 threaded by the orthodontic arch wire 102 is configured to adhere to a surface of a tooth 110b with a luting agent or resin 103a. In some exemplary embodiments, the luting agent comprises a flowable resin that is typically cured and hardened to secure the tube in place against a surface of the tooth. In the shown embodiment, the luting agent covers more than 50% of the surface area of the at least one sidewall of the tube. Although shown in the labial side, the orthodontic system may be configured for use on either the labial side of the tooth or the lingual side of the tooth as shown in FIG. 7A and FIG. 7B, and as discussed with reference to FIG. 14 below.

A method for performing an orthodontic treatment, in accordance with the present invention comprises (i) providing an arch wire 102 that is inserted through a plurality of tubes 103, the arch wire 102 configured for use on either the labial side or the lingual side of a dental arch of a patient 110a; and (ii) subsequently adhering each of the plurality of tubes 103 inserted by the arch wire 102 to the dental arch of the patient 110a using a luting agent (not necessarily although optionally included with kit 100). In some exemplary embodiments, adhering each of the plurality of tubes 103 includes surrounding an outer wall of a tube with a predetermined amount of the luting agent and pressing the tube including the luting agent against a surface of a tooth and curing the predetermined amount of the luting agent to adhere the tube to the surface of the tooth. In some exemplary embodiments, the method may further include (iii) prior to providing the arch wire 102 that is inserted through the plurality of tubes 103, adhering a first tube 109 (i.e. a separate distinct tube from the plurality of tubes already inserted on the arch wire) to a first tooth (not illustrated) situated on a first side of the dental arch of the patient 110a distal to the most posterior teeth involved in a treatment; and (iv) inserting the arch wire 102 through the first tube, wherein the first tube adhered to the first tooth provides a posterior guidance to the plurality of tubes 103.

Turning now to the next set of figures, FIG. 11A-FIG. 11C illustrate methods of applying a luting agent or resin and modifying a tube support (the resin) to achieve different treatment goals, in accordance with practice of some embodiments of the present invention. More specifically, these figures illustrate how an orthodontic system in accordance with the present invention benefits from the highly modifiable support structure provided by the luting agent, which by its nature is easy and readily altered—for example, prior to curing the luting agent—in order to achieve any number of dimensions, sizes, orientations or positioning at the instance of application or treatment to meet the needs or orthodontic treatment requirements of any number of individuals without requiring the practitioner to have a vast supply of equipment and parts of varying sizes.

For example, it is notable that a tube and support system, in which the support (i.e. the luting agent or resin) can be modified in shape and size, can provide variable orientations and positioning for each tube applied to each tooth. Moreover, because in some embodiments the tube and the arch wire can be positioned at the same time, an orthodontic system in accordance with the present invention provides a strategic advantage over prior art bracket-based systems. A primary advantage of the present system is that the support mechanism (the fluid resin that is used to adhere each tube to a tooth surface) can be stretched and molded while it is in its initial state before being cured and hardened. Such modifiability facilitates the placement of each tube in different positions—and provides a variable distance and height with respect to the surface of the tooth—favoring fast and precise positionings that is adaptable to any treatment plan for any number of patients, given that such modifiability is suitable for the highly patient-specific requirements common to orthodontic treatments.

The next figure helps to illustrate the advantages of the present invention as discussed above. FIG. 11A illustrates the effects of surrounding the outer wall of the tube with a predetermined amount of the luting agent to increase a distance between the tube and a surface of the tooth to which the tube is applied. In such case, applying the predetermined amount of the luting agent may comprise applying more of the luting agent, or an amount of the luting agent such that a larger support structure 113, which is formed by the tube encased within the surrounding luting agent once hardened after being cured. This support structure may increase the distance between the tube and the surface of the tooth 111. As such, the deformation force of the wire 112 may be configured to produce a pressure that pushes wire 112 inwards; that is, application of more resin may result exerting a force on tooth 111 that is predominantly in the lingual direction. Thus, depending on the sought treatment, practice of a method in accordance with some embodiments of the present invention may include surrounding the outer wall of the tube with a predetermined amount of the luting agent, by applying more of the luting agent to increase the distance between the tube and the surface of the tooth if the orthodontic treatment requires exerting a force on the tooth in the lingual direction.

Conversely, if a tooth is undesirably inward, then the tube may be positioned well adhered to the surface of the tooth, with minimal support material between the tube and the surface of tooth 111. This configuration helps the tensional force of recovery of the wire to take that tooth outward (e.g. in a vestibular direction). Without limiting the scope of the present invention, FIG. 11B illustrates the effects of surrounding the outer wall of the tube with a predetermined amount of the luting agent to decrease a distance between the tube and a surface of the tooth to which the tube is applied. In such case, applying the predetermined amount of the luting agent may comprise applying less of the luting agent to create a smaller support structure 113, which is formed by the tube encased within the surrounding luting agent once hardened after being cured. This smaller support structure may decrease the distance between the tube and the surface of the tooth 111. As such, the deformation force of the wire 112 may be configured to produce a pressure that pulls wire 112 outward; that is, application of less resin may result in exerting a force on tooth 111 that is predominantly in the vestibular direction. Thus, depending on the sought treatment, practice of a method in accordance with some embodiments of the present invention may include surrounding the outer wall of the tube with a predetermined amount of the luting agent, and applying less of the luting agent to decrease the distance between the tube and the surface of the tooth, if the orthodontic treatment requires exerting a force on the tooth in the vestibular direction.

FIG. 11C illustrates the versatility of implementing a support structure 113 (i.e. cured resin) with an orthodontic system in accordance with the present invention, which allows—from an initial moment of application and treatment—a practitioner to apply the required forces of a treatment in a manner that obviates otherwise unnecessary subsequent steps and follow-up treatments. This figure depicts various forces $F_a$, $F_b$, $F_c$ and $F_d$, which may be selectably applied by a practitioner's fluid manipulation of the luting agent or resin prior to curing tube 114 in a desired position. It may be appreciated that because the present invention provides a highly modifiable positioning means of the tube (which may be orientated at virtually any desired distance or angle with respect to a tooth), treatment options from an initial application of the orthodontic system are highly versatile. Prior art systems commonly using brackets, on the other hand, often require pre-fabricated brackets, which in turn requires practitioners to acquire and retain large numbers of varying sizes. Moreover, the stringent nature of brackets, which cannot practically for example be placed at certain angles or vertically on a tooth, often prolong completion of certain treatments.

To facilitate a practitioner's use of an orthodontic system in accordance with the present invention, determining the orientation of the tube with respect to the tooth may be achieved at least in part using software including a set of executable instructions for analyzing data associated with a patient. For example, and without limiting the scope of the present invention, the data associated with the patient may include photographs of the patient, tomographies of the patient, diagnostic models of the patient, and or scans of the dental arch of the patient.

This information may be used to determine an orientation of the tube with respect to the tooth in accordance with the orthodontic treatment, aiding the practitioner's decision on whether to, for example, apply a resin on tube 114 in a manner such that the tube is in a more gingival position, a more occlusal position, a more distal position or a more mesial position. Furthermore, computerized methods may be implemented in accordance with the present invention, in order for a practitioner to more efficiently take into account certain factors prior to commencing treatments—for example, and without limitation, whether a tooth should be activated or inactive.

To these ends, a prior study of a case is desirable to determine any number of parameters suitable for a particular course of treatment. Useful parameters may include: whether a current position of a tooth is correct in its present state; whether the current position is modifiable to begin with; whether a tooth position must be adjusted before adjusting the position of neighboring teeth; or whether any adjustments in positioning of a particular tooth are even desirable at the beginning stages of an orthodontic treatment. Once such parameters are understood, methods in accordance with the present invention may be more easily implemented. For example, and without limiting the scope of the present invention, an inactive position of a tube may be established by positioning the tub such that passage of the wire through the surface of the tooth does not force or stress the elastic structure of the wire. Alternatively, to activate a tooth, the steps described above may be taken to achieve the forces in the desired direction in accordance with a predetermined course of the particular orthodontic treatment.

To further facilitate orthodontic treatments, and in addition to the modifiability of the support structure adhering the tubes to each tooth, several embodiments for tubes and arch wires may be implemented in accordance with the present invention. Several of such exemplary embodiments are discussed directly below.

Figure 12:
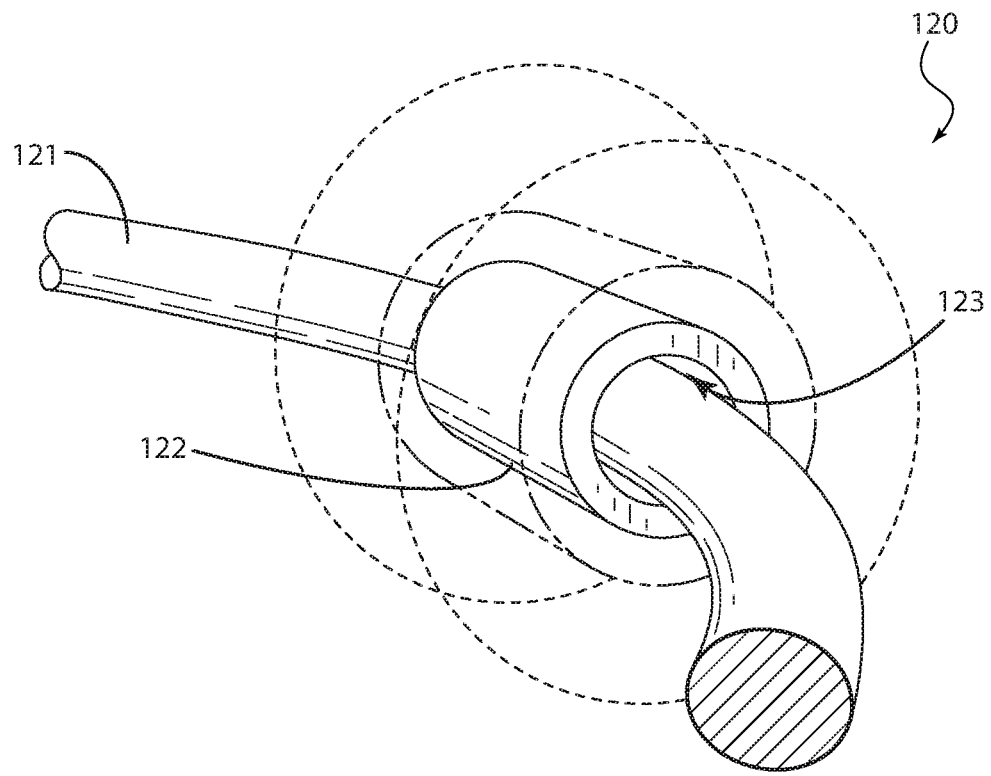
FIG. 12 illustrates a tube and arch wire in accordance with some embodiments of the present invention, in which a magnetic component is implemented in the orthodontic system.

Turning now to the next figure, FIG. 12 illustrates a tube and arch wire in accordance with some embodiments of the present invention, in which a magnetic component is implemented in the orthodontic system. More specifically, FIG. 12 depicts system 120, which includes an arch wire 121 that traverses a plurality of tubes (not all shown) including tube 122. In this exemplary embodiment, the arch wire 121 and the tube 122 may be magnetized in a manner such that a magnetic force between tube 122 and arch wire 121 causes each component to repel from each other thus creating an air cushion or slot 123. Magnetization of each component or only one of the components may be achieved in any manner without deviating from the scope of the present invention, including magnetizing only the wire, only the tube or both as shown. In such exemplary embodiments, slot 123 may facilitate a minimized friction between tube 122 and arch wire 121, which is desirable under certain conditions. When components of the present invention are magnetized, it may be desirable to have various degrees of magnetic strength available to the practitioner. For example, and without deviating from the scope of the present invention, in certain cases where increased friction may be required, an arch wire with a lower magnetic field or a null magnetic field may be implemented instead. In either embodiment, the magnetic field creating a desirable spacing between the tube and the arch wire so as to provide cushioning and thereby lower the forces applied to the tooth.

Turning to the next set of figures, FIG. 13A-FIG. 13E illustrate an orthodontic system and method, in accordance with practice of some embodiments of the present invention, in which various orientations of tubes may be achieved. Employing these varying tube orientations and wire segments, including implementation of several types of continuous or sectional arch wires in-between horizontally and or vertically oriented tubes, help achieve optimal forces that promote and accelerate desired adjustments. Moreover, the various components, discussed in turn, aid adjustments that affect a tooth individually or an area of a patient's dental arch.

Figure 13A:
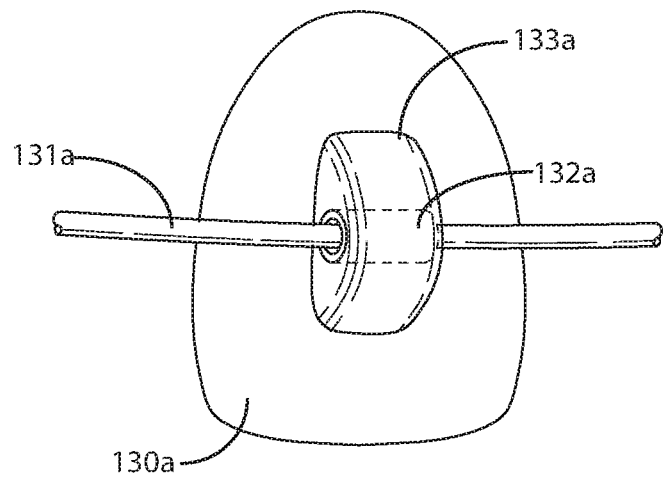
FIG. 13A-FIG. 13E illustrate an orthodontic system and method, in accordance with practice of some embodiments of the present invention, in which various orientations of tubes may be achieved including implementation of various types of continuous or sectional arch wires in-between the tubes.
Figure 13B:
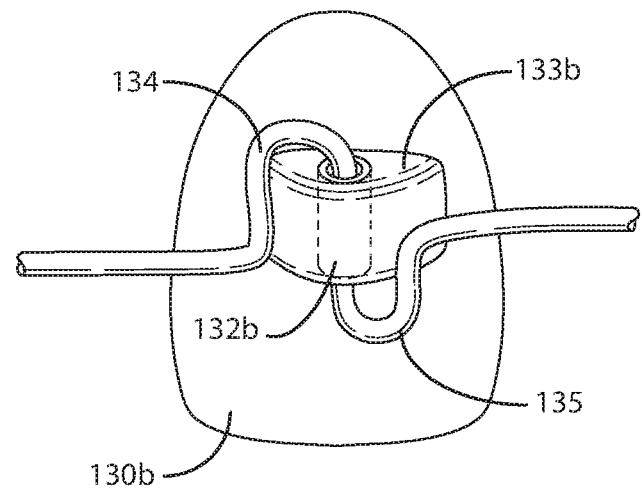

FIG. 13A and FIG. 13B depict teeth 130a and 130b, shown with different orthodontic treatments. Tooth 130a has been treated with an arch wire 131a that traverses tube 132a, which has been adhered horizontally by luting agent, cured into a support structure 133a—such exemplary embodiment is similar to those discussed above. Support structure 133a comprises of a luting agent that has been applied and typically cured to hardened and adhere to tooth 130a. In some embodiments, as will be mentioned below with reference to other figures, support structure 133a may include a luting agent including an elastic component that gives the support structure a desired elasticity coefficient. In other exemplary embodiments, support structure 133a may include two or more types of luting agents—for example, and without limitation a first luting agent including an elastic component, and a second luting agent excluding the elastic component—such that the first luting agent (when cured) has a higher elasticity coefficient than the second luting agent. Tooth 130b, on the other hand is depicted as being treated with an arch wire that includes a first section 134 looping or curving to run parallel to the vertically oriented tube 132b for a portion of the wire until curving back into a top opening of tube 132b. A second section 135 of the arch wire runs from a bottom opening of the vertically oriented tube 132b and includes a second u-shaped turn prior to curving back into a path substantially perpendicular to the vertically oriented tube 132b.

As in other embodiments, tube 132b is adhered to tooth 130b via a luting agent that has been cured to form a hardened support structure 133b. In some exemplary embodiments, the arch wire may be a continuous wire and in alternative exemplary embodiments, the arch wire may include various wire segments that can be individually inserted into the desired tubes, which may be previously adhered to a treated tooth in a particular position and orientation; the wire segments may have a single curve or multiple curves or may be straight line segments without limiting the scope of the present invention.

Figure 13C:
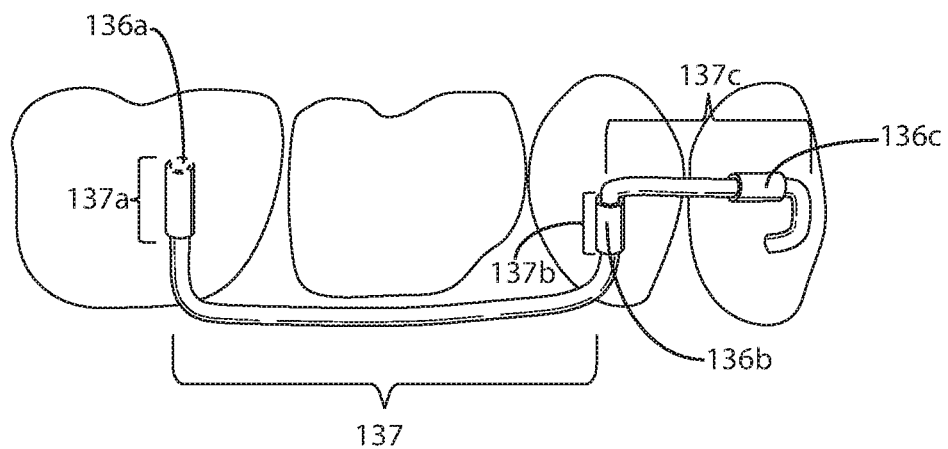

FIG. 13C shows another set of treated teeth that are treated with a variety of differently oriented tubes and wire segments. More specifically, FIG. 13C depicts a set of treated teeth including tubes 136a and 136b, which are both vertically oriented, and tube 136c, which is horizontally oriented (for the sake of brevity and clarity, these figures do not depict support structures or cured luting agent that may adhere each tube to each tooth). In this particular instance, a wire segment 137 includes curved portions at its terminal ends that are substantially perpendicular to a longer middle portion of the wire segment 137, which are inserted into tubes 136a and 136b. In one embodiment, wire segment 137 is continuous and integral with segment 137c; in another embodiment, wire segment 137 is separate and distinct from segment 137c, both adjoined or adhered together at vertically oriented tube 136b. Moreover, various configurations may be desirable for treatment of sections of teeth that attend to both active and inactive or passive treatments.

Figure 13D:
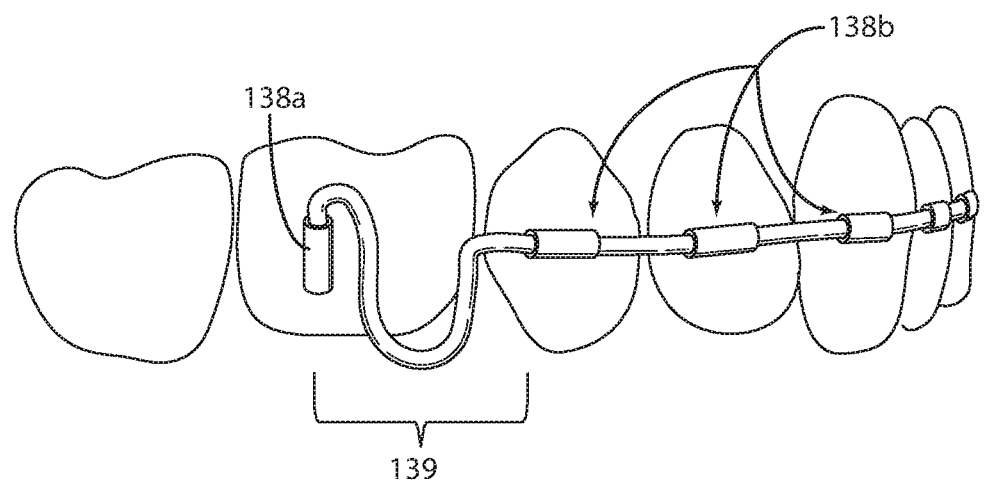

Accordingly, practice of some exemplary embodiments of the present invention may include (i) adhering a first vertically oriented tube 136a on the labial side or the lingual side of the dental arch of the patient, and respectively adhering a second vertically oriented tube 136b on the labial side or the lingual side of the dental arch of the patient; and (ii) inserting a first terminal end 137a and a second terminal end 137b of an arch wire segment 137 into the first vertically oriented tube 137a and the second vertically oriented tube 137b, respectively. Practice of some exemplary embodiments of the present invention may include (i) adhering a vertically oriented tube on the labial side or the lingual side of the dental arch of the patient, and respectively adhering a horizontally oriented tube on the labial side or the lingual side of the dental arch of the patient; and (ii) inserting a first terminal end of an arch wire segment into the vertically oriented tube and a second terminal end of the arch wire segment into the horizontally oriented tube. For example, and without limiting the scope of the present invention, FIG. 13D shows another set of treated teeth that are treated with a variety of differently oriented tubes and wire segments. More specifically, FIG. 13D depicts a set of treated teeth including a vertically oriented tube 138a and a plurality of horizontally oriented tubes 138b connected via a wire segment 139, which may be integral with a remaining portion of an arch wire or may be separate from the remaining portion of the arch wire.

Figure 13E:
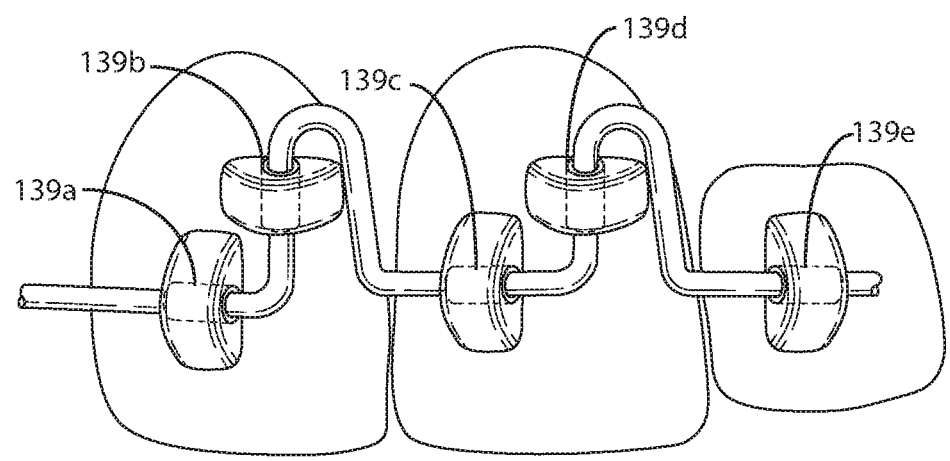

As mentioned above, a system in accordance with the present invention may employ a combination of horizontally oriented tubes and vertically oriented tubes. Moreover, multiple tubes may be adhered to a single tooth and varying numbers of tubes may be adhered to each tooth in a set or group of teeth being treated. FIG. 13E illustrates multiple tubes 139a-139e, wherein tubes 139a and 139b are positioned horizontally and vertically, respectively, and both attached to a first tooth at slightly different elevations, a single wire segment passing through each tube, the wire segment having a substantially perpendicular curve or L-shape in order to traverse the horizontally oriented tube 139a as well as the vertically oriented tube 139b. Similarly, tubes 139c and 139d are positioned horizontally and vertically, respectively, and both attached to a second tooth, each also at slightly different elevations, wherein the single wire segment also passes through each tube, wherein the wire segment continues outward from tube 139b to form a U-shaped bend or curve and follows with yet another substantially perpendicular curve in order to traverse the horizontally oriented tube 139c, following with yet another substantially perpendicular curve in order to traverse the vertically oriented tube 139d. The wire segment follows a similar pattern and terminates within horizontally oriented tube 139e.

Figure 14:
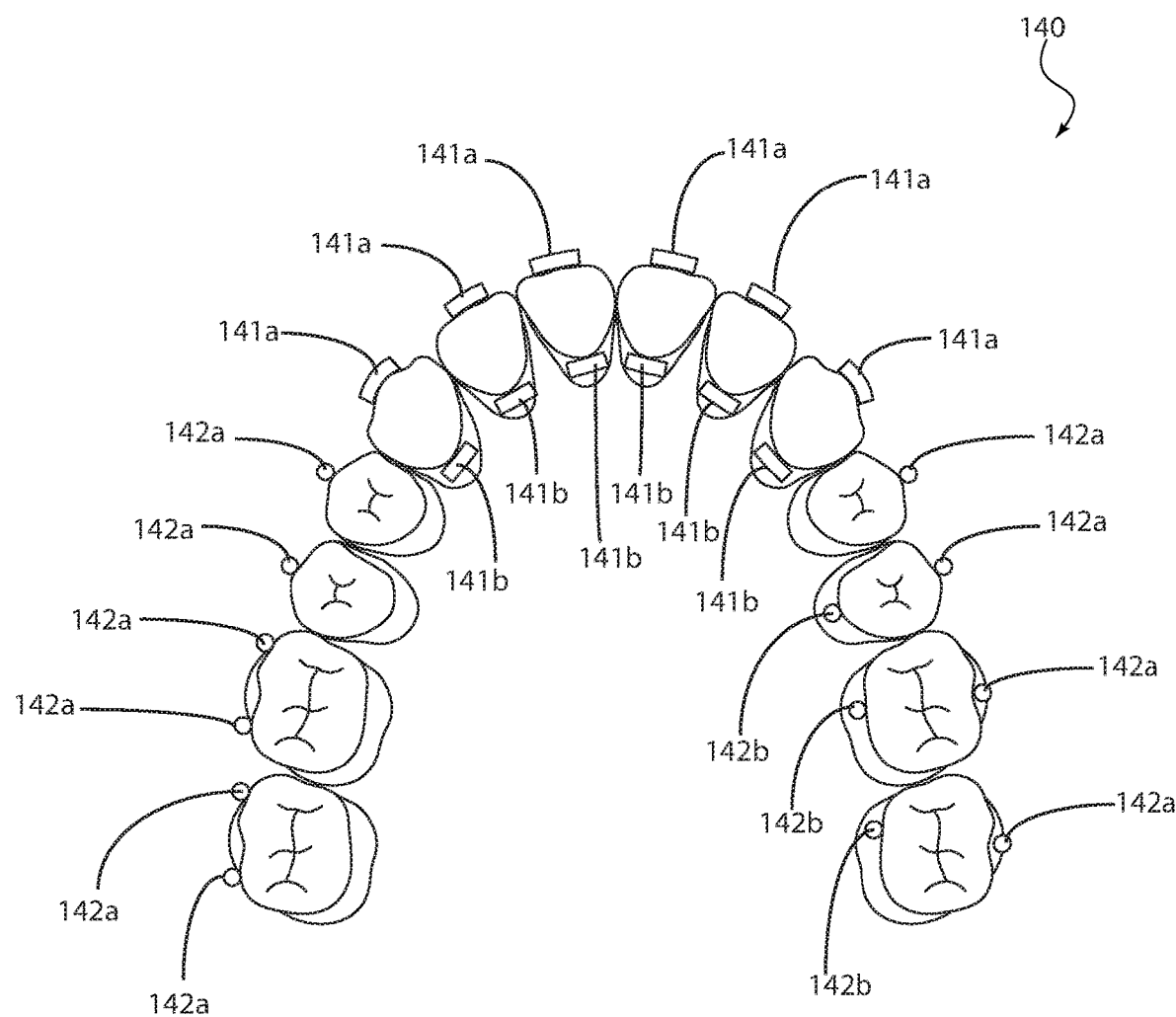
FIG. 14 illustrates a top view of a patient's dental arch to which an orthodontic system employing both vertically oriented and horizontally oriented tubes has been applied, in accordance with some embodiments of the present invention.

Turning now to the next figure, FIG. 14 illustrates a top view of a patient's dental arch to which an orthodontic system employing both vertically oriented and horizontally oriented tubes has been applied, in accordance with some embodiments of the present invention. More specifically, FIG. 14 depicts several teeth of dental arch 140 treated with tubes on both the labial side and the lingual side of the dental arch 140; a first plurality of horizontally oriented tubes 141a have been adhered on the labial side of dental arch 140 and a second plurality of horizontally oriented tubes 141b have been adhered on the lingual side of dental arch 140. Moreover, a first plurality of vertically oriented tubes 142a have been adhered on the labial side of dental arch 140, and a second plurality of vertically oriented tubes 142b have been adhered on the lingual side of dental arch 140. Each of these tubes may be connected with continuous or distinct arch wire segments connecting the tubes, in various configurations depending on the desired treatment.

Figure 15A:
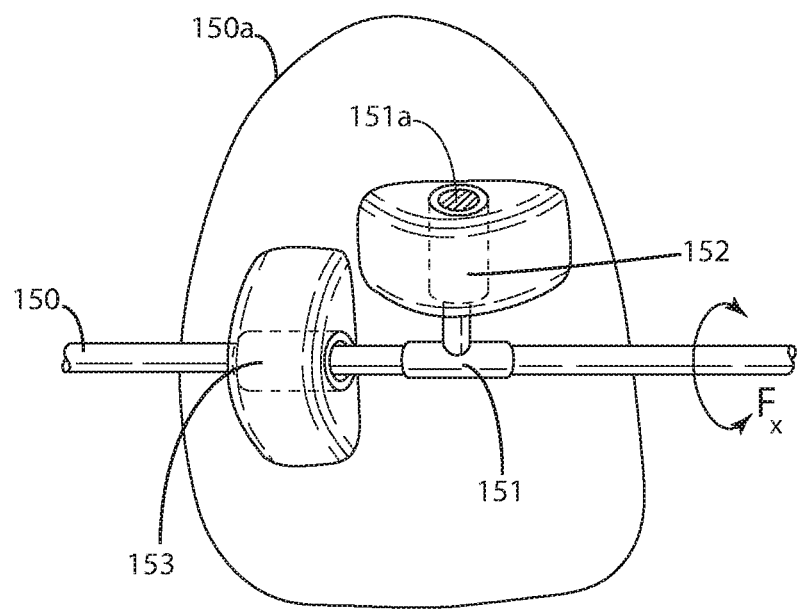
FIG. 15A-FIG. 15B illustrate an orthodontic system and method, in accordance with practice of some embodiments of the present invention, in which application of tubes in various orientations may be facilitated by one or more extensions coupled to the arch wire of the orthodontic system.
Figure 15B:
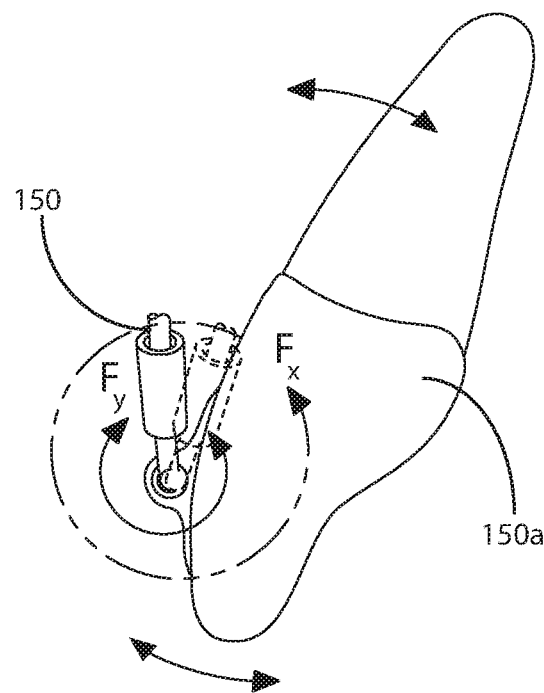

FIG. 15A-FIG. 15B illustrate an orthodontic system and method, in accordance with practice of some embodiments of the present invention, in which an extension may be coupled to an orthodontic arch wire in order to facilitate the adhering of differently oriented tubes on a single tooth— such as, for example, adhering a first tube to a tooth wherein the first tube is oriented horizontally, and adhering a second tube to the same tooth wherein the second tube is adhered vertically. This configuration allows for multidirectional forces being applied to a single tooth and thus speed up a desired movement of the patient's teeth. More specifically, FIG. 15A shows a front view of a tooth 150a to which two tubes 153 and 152 have been adhered to, with an arch wire 150 traversing through the horizontally oriented tube 153. In order to secure the arch wire 150 within the vertically oriented tube 152, the arch wire 150 may include a protruding support structure or extension 151, which may be defined by a tubular body that is also traversed by, or otherwise coupled to the the arch wire 150, the tubular body including a substantially perpendicular protrusion 151a that engages with the opening of the tube 152. In exemplary embodiments as shown, the extension 151 comprises a T-shaped extension with protrusion 151a. In exemplary practice of the present invention, a practitioner may couple or even snap on extension 151 to arch wire 150. Each tube may be adhered to tooth 150a prior to or after the arch wire is in place as discussed in this disclosure. In one exemplary embodiment, arch wire 150 is placed over tooth 150a the arch wire including extension 151 (having been previously coupled to or snapped on to arch wire 150). Subsequently, a vertically oriented tube 152 may be registered with protrusion 151a of extension 151 and thereafter adhered. In some embodiments, vertically oriented tube 152 may have been previously adhered to tooth 150a and thus protrusion 151a of extension 150 may be inserted into tube 152 at the time arch wire 150 is placed over the tooth 150a. In some exemplary embodiments, tube 153 may already be on arch wire 150 said arch wire 150 previously inserted through tube 153; in such instances, once extension 151 is secured to adhered tube 152, horizontally oriented tube 153 may be placed at the desired location on tooth 150a and adhered to tooth 150a.

FIG. 15B depicts the forces that may be applied by such structure or configuration of tubes on the tooth, again depending in part on the composition of the applied luting agent that forms the support structure adhering the tube to the tooth, as well as the orientation angles and distance of each tube with respect to the tooth. Forces $F_x$ may refer to forces applied to tooth 150a via the placement of the arch wire, while forces $F_y$ may refer to forces applied on tooth 150a via the support structure or manner in which the luting agent is applied to each tube, for example per the discussion with reference to FIG. 11A-11C. The other unmarked arrows indicating potential movement of the tooth depending on the specific treatment applied to tooth 150a.

Figure 16A:
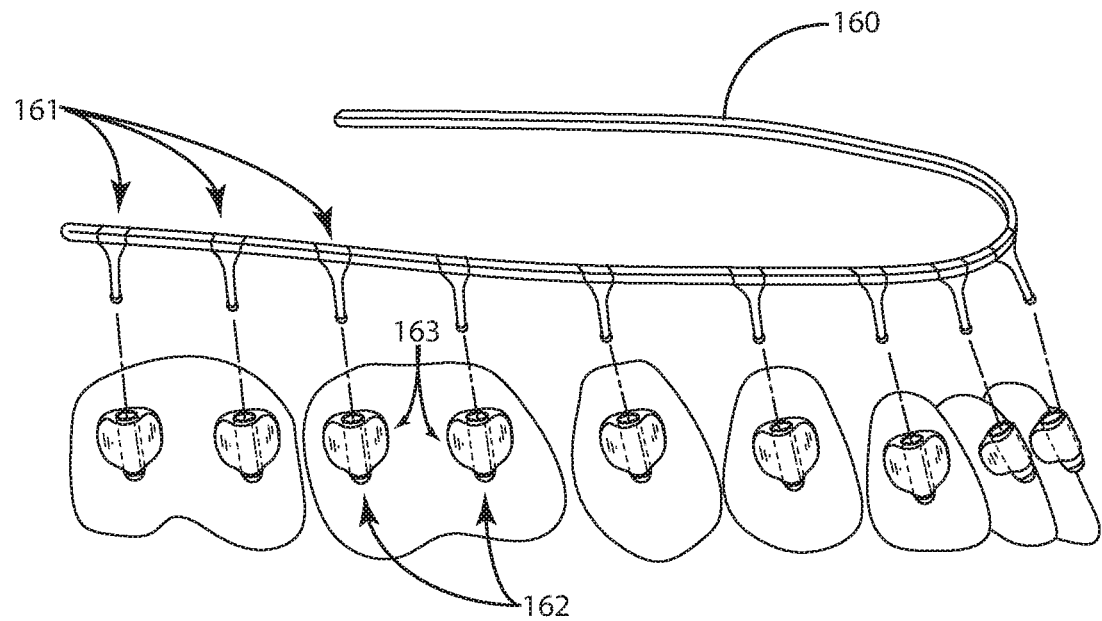
FIG. 16A-FIG. 16B illustrate an orthodontic system and method, in accordance with practice of some embodiments of the present invention, in which application of tubes in various orientations may be facilitated by one or more pins projecting from the arch wire of the orthodontic system.
Figure 16B:
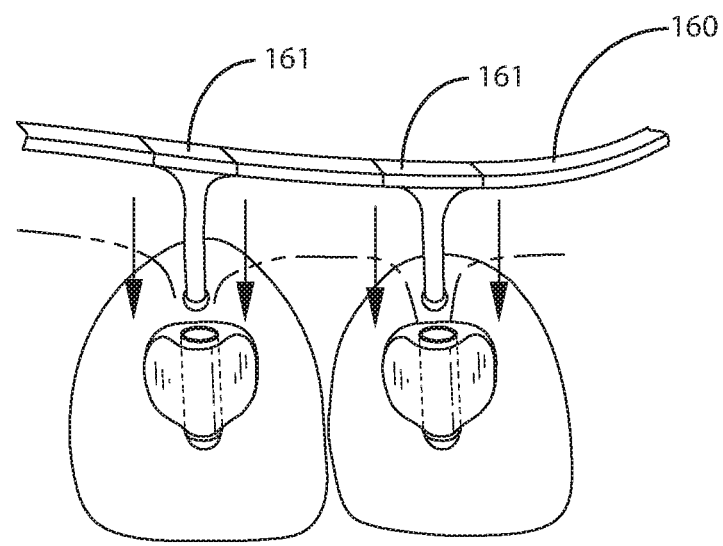

Similarly, figures FIG. 16A-FIG. 16B illustrate an orthodontic system and method, in accordance with practice of some embodiments of the present invention, in which application of tubes in various orientations may be facilitated by one or more pins projecting from the arch wire of the orthodontic system, which register with one or more corresponding tubes, the tubes cured against each tooth with a resin prior to registering with the pins on the arch wire. In exemplary embodiments such as the one illustrated in FIG. 16A, an orthodontic arch wire 160 includes one or more pins 161 extending or projecting outwardly and configured to register vertically with one or more tubes 162. In some exemplary embodiments, pins 161 are integral with orthodontic arch wire 160. In some exemplary embodiments, pins 161 are separate components that may be coupled to orthodontic arch wire 160.

As such, a method of performing an orthodontic treatment utilizing such embodiment of the present invention may include (i) adhering one or more vertically oriented tubes 162 on the labial side or the lingual side of the dental arch of the patient, wherein the arch wire 160 includes one or more pins 161 extending or projecting from the arch wire 160 configured to register with a corresponding tube of the one or more vertically oriented tubes 162; and (ii) inserting each of the one or more pins 161 in the corresponding tube of the one or more vertically oriented tubes 162. In some embodiments, the vertically oriented tubes 162 may be previously adhered to each tooth (or multiple tubes to a single tooth, via support structures 163 comprising cured luting agent, cured and thus adhered to the teeth or tooth prior to inserting the arch wire 160.

As may be appreciated from the view of FIG. 16B, once the arch wire 160 is in place, and the pins aligned to their corresponding tubes, the pins may be inserted therein. In exemplary embodiments, each pin includes a predetermined inclination or orientation that is commensurate with the desired treatment. In exemplary embodiments, a method of performing an orthodontic treatment may include (i) providing an arch wire 160 that includes one or more pins 161 extending outwardly (in this case also downwardly, but without limitation may be upwardly) and configured to register vertically with a tube 162, the tube 162 including at least one sidewall and two opening ends that form a tubular passage adapted to receive a portion of one of the one or more pins 161; (ii) adhering the tube with a luting agent (and curing the luting agent to form support structures 163) to a tooth on a labial side or a lingual side of a dental arch of a patient, the tube positioned vertically on a surface of the tooth; (iii) positioning the arch wire 160 to align a pin of the one or more pins 161 of the arch wire 160 with the tube; and (iv) inserting the pin into the tube.

Figure 17A:
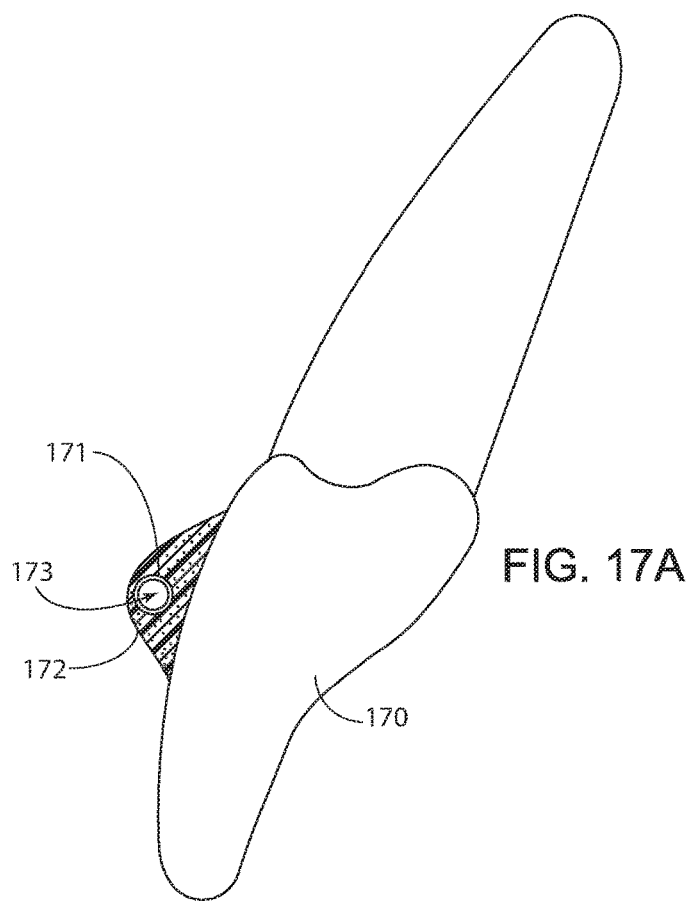
FIG. 17A-FIG. 17C illustrates a lateral view of a tooth that is treated with an orthodontic system according to some embodiments of the present disclosure.
Figure 17B:
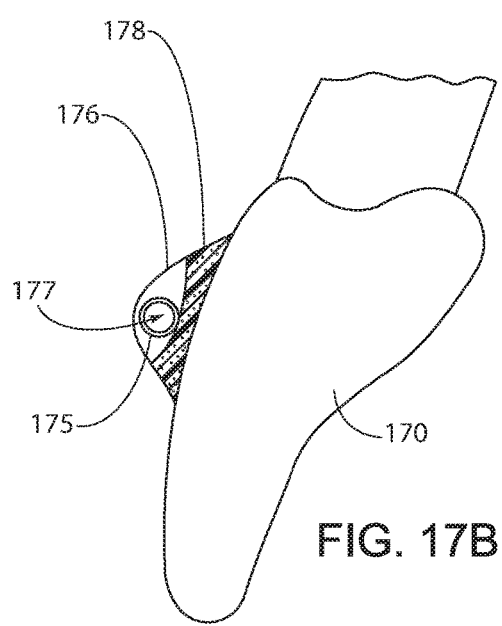
Figure 17C:
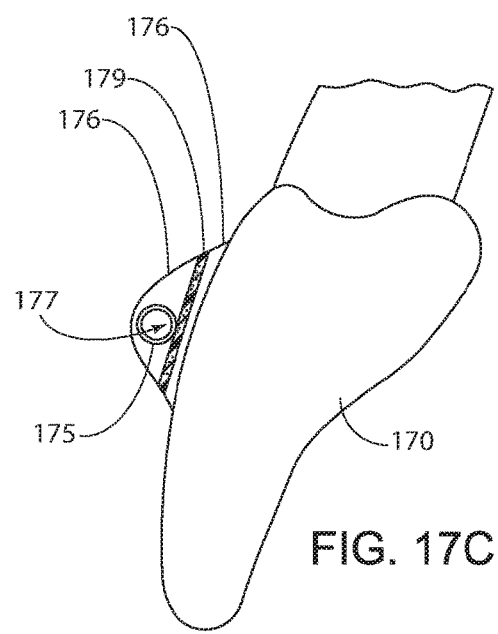

FIG. 17A-FIG. 17C illustrate a lateral view of a tooth that is treated with an orthodontic system according to some exemplary embodiments of the present disclosure, in which an elastic component or support may be employed. As will be discussed in turn, in some exemplary embodiments, the elastic support may comprise a luting agent or resin that includes an elastic composition or elastic component mixed in with the luting agent, such that upon curing the luting agent, the composition has a higher elasticity coefficient than a typical luting agent. The higher elasticity coefficient of the elastic component of such luting agent may be used in a variety of ways, as discussed in turn, in order to add a cushioning layer between each tube (traversed on an arch wire) and the surface of the tooth. When the system is applied, such elastic components allow for lower forces to be applied, which have been shown to be better received by the tooth on which these forces are applied during a treatment—allowing a desired movement of the tooth to be achieved more expeditiously and efficient than traditional methods employing higher forces directly on the tooth being treated. In some exemplary embodiments, only a luting agent or resin including an elastic component may be employed for at least one tooth. In some exemplary embodiments, a regular resin support or luting agent is employed in combination with a luting agent or resin including an elastic component. In some exemplary embodiments, rather than a luting agent or resin including an elastic component, an elastic base comprising an elastic material with a desirable elasticity coefficient may be employed for at least one tooth.

FIG. 17A depicts tooth 170 to which tube 171 has been adhered with, and entirely covered or surrounded by, a luting agent including an elastic composition or component, cured to form a hardened support structure 172. The tube 171 typically includes openings such as opening 173 through which an orthodontic arch wire is traversed. As such, support structure 174, being cured from a luting agent including an elastic component, hardens with a desired elasticity that helps cushion the forces applied to tooth 170 in part via a wire traversing through tube 171, and in part via the positioning of the tube 171 in a manner as described with reference to FIG. 11A-FIG. 11C.

Accordingly, a method for performing an orthodontic treatment, in accordance with some embodiments of the present invention, may include providing an orthodontic arch wire that is inserted through a plurality of tubes, the orthodontic arch wire configured for use on either the labial side or the lingual side of a dental arch of a patient, and subsequently, adhering each of the plurality of tubes on the orthodontic arch wire to the dental arch of the patient using a luting agent. In some exemplary embodiments as shown in FIG. 17A, the luting agent includes an elastic composition that surrounds the tube. In some embodiments, the arch wire is previously inserted through tube 171. In other exemplary embodiments, the arch wire is inserted into the tube (through opening 173) after the tube and luting agent including an elastic component as been adhered to the tooth and cured. In some embodiments, the method may comprise adhering at least one of the plurality of tubes on the orthodontic arch wire to a tooth of the dental arch of the patient by: surrounding an outer wall of a tube with a predetermined amount of the luting agent; and curing the predetermined amount of the luting agent to adhere the tube to a surface of a tooth, wherein the luting agent includes an elastic composition.

In a similar embodiment with a similar purpose, FIG. 17B depicts tooth 170 to which tube 175 has been adhered with a luting agent cured to form a hardened support structure 176 that does not include an elastic component. The tube 175 typically includes openings such as opening 177 for inserting an orthodontic arch wire therethrough. In some exemplary embodiments as shown, a layer of another luting agent 178 that does include an elastic component may be employed between the tube 175 and a surface of tooth 170.

Accordingly, in some embodiments as shown in FIG. 17B, a method may include adhering at least one of a plurality of tubes on an orthodontic arch wire to a tooth of a dental arch of the patient, by: applying a predetermined amount of luting agent 178 on a surface of tooth 170, the luting agent 178 comprising a first luting agent having a first elasticity coefficient. Further, such method may include curing the luting agent 178 to adhere the luting agent 178 to the surface of the tooth. Moreover, such method may include surrounding an outer wall of tube 175 on the orthodontic arch wire (or in some embodiments as mentioned above the wire may be inserted after the tube is adhered) with a predetermined amount of a second luting agent 176 having a second elasticity coefficient (for example, and without limiting the scope of the present invention, luting agent 176 does not include an elastic composition or elastic component), wherein the first elasticity coefficient is higher than the second elasticity coefficient. Furthermore, the method may then include curing the predetermined amount of the second luting agent 176 to adhere the tube 175 to the surface of the cured first luting agent 178. In other exemplary embodiments, curing the luting agents 176 and 178 may be performed in a single step, such that both agents are cured together.

In yet another similar embodiment with a similar purpose of adding a desired cushioning between a tube and a tooth, the shown embodiment of FIG. 17C includes an elastic base 179 has been positioned beneath tube 175 so that it is sandwiched or held in place between tube 175 and a surface of tooth 170. In exemplary embodiments, elastic base 179 may include a planar body that may serve as an elastic layer between the tube and a surface of the tooth. In exemplary embodiments, the entire structure is encased with a luting agent cured to form the hardened support structure 176, which encapsulates both the tube 175 and the elastic base 179. In practice, in accordance with some exemplary embodiments of the present invention, prior to curing a predetermined amount of a luting agent, the elastic base 176 may be adhered between the outer wall of tube 175 and the surface tooth 170 with the luting agent.

Accordingly, in some embodiments, a method may include adhering at least one of the plurality of tubes on the orthodontic arch wire to a tooth of the dental arch of the patient, by: surrounding an elastic base 179 with a first predetermined amount of the luting agent 176; pressing a bottom surface of the elastic base 179 including the first predetermined amount of the luting agent against a surface of the tooth 170; surrounding an outer wall of a tube 175 on the orthodontic arch wire with a second predetermined amount of the luting agent 176; placing the tube 175 on a top surface of the elastic base 179; and curing the first and the second predetermined amounts of the luting agent 176 to adhere the elastic base 179 to the surface of the tooth 170, and adhere the tube 175 to the top surface of the elastic base 179 such that the elastic base 179 is sandwiched between the surface of the tooth 170 and the outer wall of the tube 175.

In some exemplary embodiments such as the one disclosed in turn with reference to FIG. 18 and FIG. 19, a similar cushioning effect may be achieved with a tube 181 that includes an outer surface or outer layer 190 treated or otherwise covered with or including a layer of an elastic component, which may comprise a pharmaceutical grade rubber, silicon or any other elastic material suitable for medical devices. The purpose of such is to alleviate some of the forces otherwise endured between the tube and wire, especially where particularly stronger forces are required in a treatment. In some exemplary embodiments, the elastic outer layer runs an entire length of tube 181. In exemplary embodiments such as shown, a tube 181 including an elastic outer layer 190 may be adhered to tooth 180 via a luting agent 182 that is cured and thus adhered to tooth 180. When pressures or forces resulting from a traversing wire through opening 183 of the tube 181 are applied to tooth 180, the elastic layer 190 will alleviate some of the force and provide a cushioning effect that is desirable. FIG. 19 shows how opening 183 will receive an arch wire or segment of an arch wire such that the arch wire will make contact with a metal surface 191 of tube 181, but the outer surface of the tube 181 adhered to a surface of tooth 180, for example, will be in direct contact with the tooth and or luting agent 182 as shown.

Turning now to the next figures, FIG. 20A-FIG. 20E illustrate yet another orthodontic system according to some embodiments of the present disclosure, in which a tube includes an exterior housing or outer tube enclosing an interior D-shape tube that fits securely but is able to rotate within the exterior housing and about a common longitudinal axis. More specifically, FIG. 20A-FIG. 20E depict tube 200, which comprises an outer housing or outer tube 201, which encloses an inner tube 202 that is rotatable about a common longitudinal axis of both outer and inner tubes. The outer tube 201 includes openings on either end and has a circular cross-section. The inner tube 202 includes openings on either end and has a D-shaped cross-section. Moreover, the outer tube 201 includes an opening 203 situated along a length of its outer surface 204, through which a portion of a top surface 205 of the inner tube 202 is exposed. The top surface 205 of the inner tube 202 includes a ridge or wedge 206 that protrudes slightly above the opening 203. Pushing or pulling on the wedge 206 causes the inner tube 202 to rotate about the longitudinal axis between a first position where the wedge contacts a side top surface wall of the outer tube 201, and a second position and a second position where the wedge contacts the opposite side top surface wall of the outer tube 201.

Because the interior tube is able to rotate a predetermined distance (between a first position where the wedge contacts a side top surface wall of the outer tube 201, and a second position and a second position where the wedge contacts the opposite side top surface wall of the outer tube 201), the orientation of the D-shaped cross section may be variably positioned. When used in combination with a rectangular or squared wired, the movement of the D-shaped cross-section and more specifically the flat wall 207 of the inner tube 202, is able to adjust or modify positioning of a tooth's root. FIG. 20C-FIG. 20E illustrate several positions achieved by rotating the inner tube, depending on the starting point or original orientation of the outer tube.

The foregoing detailed description has set forth various embodiments of the devices and/or processes by the use of diagrams, flowcharts, and/or examples. Insofar as such diagrams, flowcharts, and/or examples contain one or more functions and/or operations, it will be understood by those within the art that each function and/or operation within such diagrams, flowcharts, or examples may be implemented, individually and/or collectively, by a wide range of hardware, software, firmware, or virtually any combination thereof.

Those skilled in the art will recognize that it is common within the art to describe devices and/or processes in the fashion set forth herein, and thereafter use engineering practices to integrate such described devices and/or processes into other orthodontic systems. That is, at least a part of the devices and/or processes described herein may be integrated into an orthodontic system via a reasonable amount of experimentation.

The subject matter described herein sometimes illustrates different components contained within, or connected with, other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

All references, including but not limited to patents, patent applications, and non-patent literature are hereby incorporated by reference herein in their entirety.

An orthodontic system and method of use has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. An orthodontic kit, comprising:
   a package;
   an orthodontic arch wire enclosed in the package; and
   a plurality of tubes inserted onto the orthodontic arch wire, each including at least one sidewall and two opening ends that form a tubular passage adapted to allow the orthodontic arch wire to move along a length of the tubular passage, wherein:

each of the plurality of tubes is configured to adhere to a surface of a tooth with a luting agent, and each of the plurality of tubes comprises a hard material that allows the tubular passage to withstand forces exerted by the orthodontic arch wire on each of the plurality of tubes during an orthodontic treatment in which at least one of the plurality of tubes is adhered to the surface of at least one tooth, so that a cross-section of each tube is preserved throughout the orthodontic treatment.

2. The orthodontic kit of claim 1, wherein the hard material comprises a ceramic.

3. The orthodontic kit of claim 1, further comprising removable adhesive blocks adhered to terminal ends of the orthodontic arch wire preventing the plurality of tubes from becoming unthreaded from the orthodontic arch wirer.

4. The orthodontic kit of claim 1, further comprising a removable adhesive block adhered to a middle region of the orthodontic arch wire.

5. The orthodontic kit of claim 1, wherein each of the plurality of tubes excludes a base, a notch, a wing, or a combination thereof.

6. The orthodontic kit of claim 1, further comprising at least one elastic base configured to support a tube of the plurality of tubes, the elastic base adapted to adhere between the tube and the surface of the tooth with the luting agent.

7. The orthodontic kit of claim 1, wherein at least one of the plurality of tubes further includes an elastic outer layer.

8. The orthodontic kit of claim 1, further comprising a first luting agent including an elastic composition having a first elasticity coefficient.

9. The orthodontic kit of claim 8, further comprising a second luting agent having a second elasticity coefficient higher than the first elasticity coefficient of the first luting agent.

10. The orthodontic kit of claim 8, wherein the first luting agent comprise at least one material selected from the group consisting of a light-cure material, a self-cure material, and a dual-cure material.

11. The orthodontic kit of claim 1, wherein at least one of the plurality of tubes further includes:

an outer tube having an opening along a length of an outer surface of the outer tube; and a rotatable inner tube having a D-shaped cross-section and a wedge extending through the opening of the outer tube such that moving the wedge of the inner tube along the opening of the outer tube rotates the inner tube causing a change in an orientation of the D-shaped cross-section.

12. The orthodontic kit of claim 1, wherein at least one of the plurality of tubes further includes a pre-applied luting agent on a surface of the tube.

13. The orthodontic kit of claim 1, wherein the plurality of tubes or the orthodontic arch wire is magnetized.

14. The orthodontic kit of claim 1, wherein at least one of the plurality of tubes inserted onto the orthodontic arch wire comprises one or more flared end sections.

15. The orthodontic kit of claim 1, wherein the orthodontic arch wire includes:

one or more pins projecting outwardly from the orthodontic arch wire and configured to register vertically with one or more tubes; and at least one tube vertically coupled to at least one of the one or more pins projecting outwardly from the orthodontic arch wire.

16. The orthodontic kit of claim 1, further including a second package enclosing one or more loose orthodontic components configured to receive a portion of the orthodontic arch wire, the one or more loose orthodontic components selected from the group consisting of:

a tube excluding a base, a tube including a pre-applied luting agent on a surface of the tube, and a T-shaped extension configured to couple to a portion of the orthodontic arch wire, the extension including a protrusion adapted to sit perpendicular with the orthodontic arch wire, and adapted to be inserted into a vertically oriented tube.

17. The orthodontic kit of claim 1, further including:

a first tube adapted to adhere to a first tooth situated on a labial side or a lingual side of a dental arch of a patient distal to a most posterior section of teeth involved in an orthodontic treatment; and a second tube adapted to adhere to a second tooth situated on an opposite labial side or an opposite lingual side of the dental arch of the patient, respectively;

wherein the first tube and the second tube are each further adapted to receive a terminal end of the orthodontic arch wire that includes the plurality of tubes inserted onto the orthodontic arch wire.

18. The orthodontic kit of claim 17, wherein at least one of the first tube or the second tube comprises one or more flared end sections.

19. The orthodontic kit of claim 1, wherein the package comprises a self-seal sterilization pouch for keeping the orthodontic arch wire and plurality of tubes securely enclosed.

* * * * *